March 19, 1940.  E. E. KLEINSCHMIDT  2,193,967
AUTOMATIC MESSAGE EXCHANGE SYSTEM
Original Filed Jan. 5, 1933  9 Sheets-Sheet 1

INVENTOR
EDWARD E. KLEINSCHMIDT
BY
ATTORNEY

March 19, 1940.  E. E. KLEINSCHMIDT  2,193,967
AUTOMATIC MESSAGE EXCHANGE SYSTEM
Original Filed Jan. 5, 1933  9 Sheets-Sheet 2
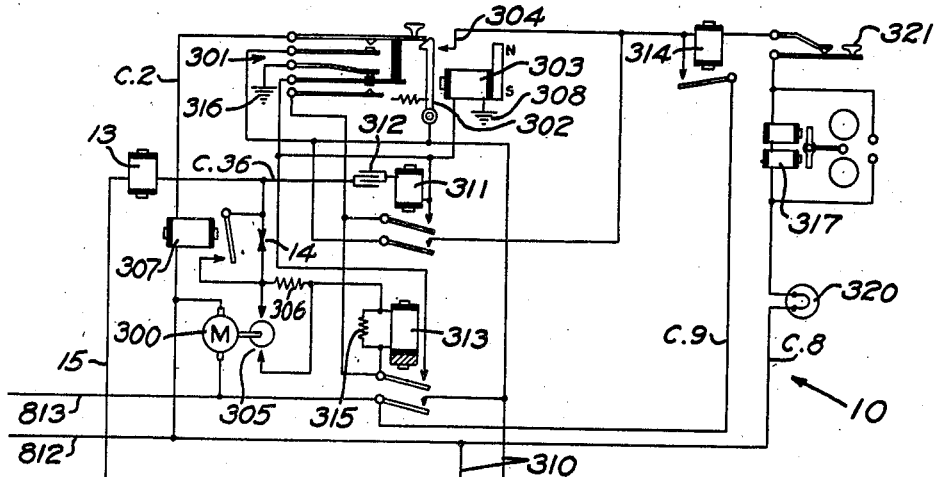
FIG. 4
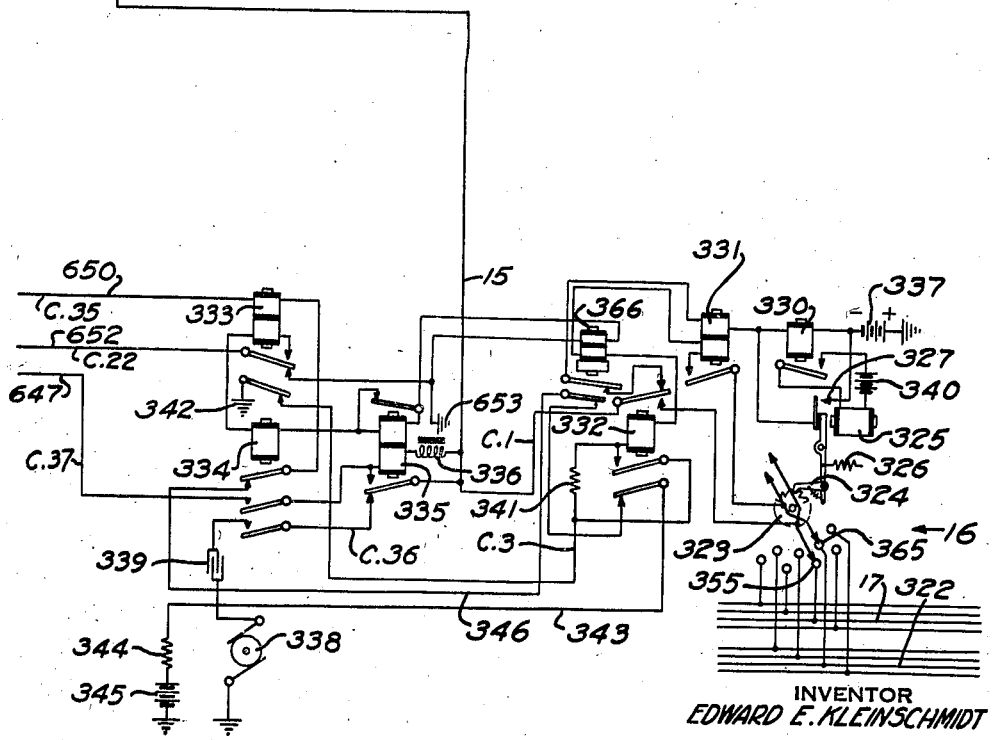
INVENTOR
EDWARD E. KLEINSCHMIDT
BY
ATTORNEY March 19, 1940.    E. E. KLEINSCHMIDT    2,193,967
AUTOMATIC MESSAGE EXCHANGE SYSTEM Original Filed Jan. 5, 1933    9 Sheets-Sheet 3

INVENTOR
EDWARD E KLEINSCHMIDT
BY
ATTORNEY

March 19, 1940.   E. E. KLEINSCHMIDT   2,193,967
AUTOMATIC MESSAGE EXCHANGE SYSTEM
Original Filed Jan. 5, 1933   9 Sheets-Sheet 5

INVENTOR
EDWARD E. KLEINSCHMIDT
BY
H.B. Whitfield
ATTORNEY

March 19, 1940.   E. E. KLEINSCHMIDT   2,193,967
AUTOMATIC MESSAGE EXCHANGE SYSTEM
Original Filed Jan. 5, 1933   9 Sheets-Sheet 6

INVENTOR
EDWARD E. KLEINSCHMIDT
BY
ATTORNEY

March 19, 1940.  E. E. KLEINSCHMIDT  2,193,967
AUTOMATIC MESSAGE EXCHANGE SYSTEM
Original Filed Jan. 5, 1933   9 Sheets-Sheet 8
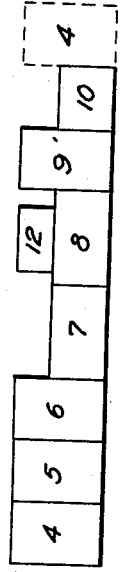
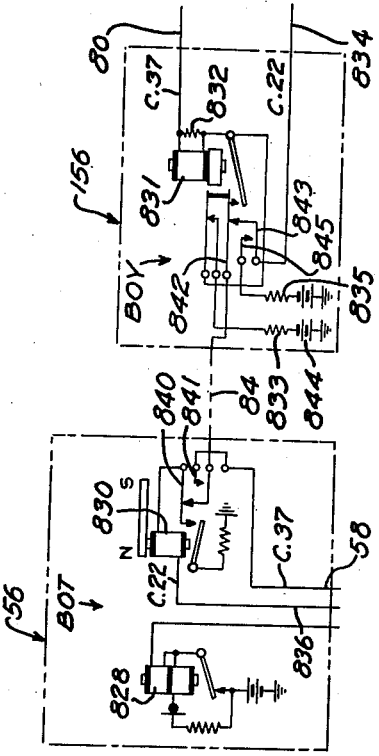
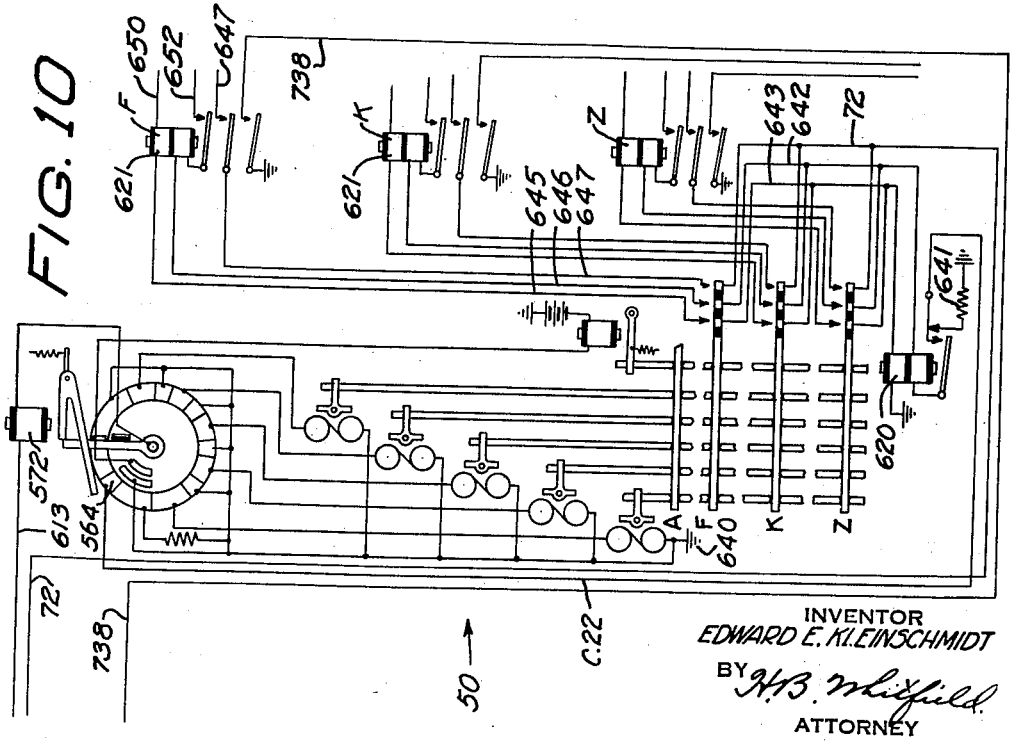
INVENTOR
EDWARD E. KLEINSCHMIDT
BY
ATTORNEY March 19, 1940.  E. E. KLEINSCHMIDT  2,193,967
AUTOMATIC MESSAGE EXCHANGE SYSTEM
Original Filed Jan. 5, 1933  9 Sheets-Sheet 9
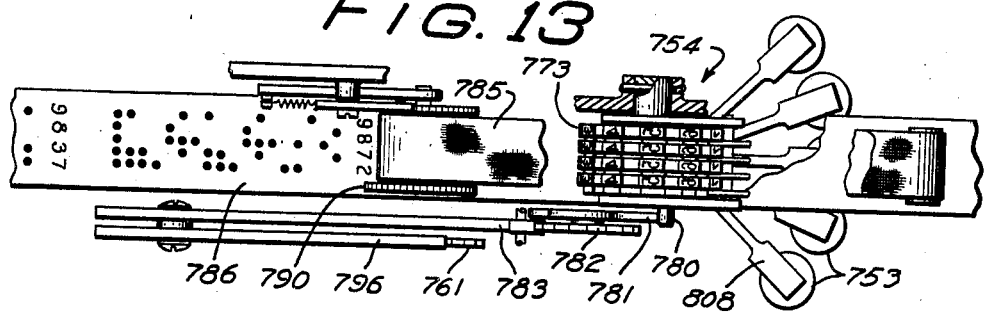
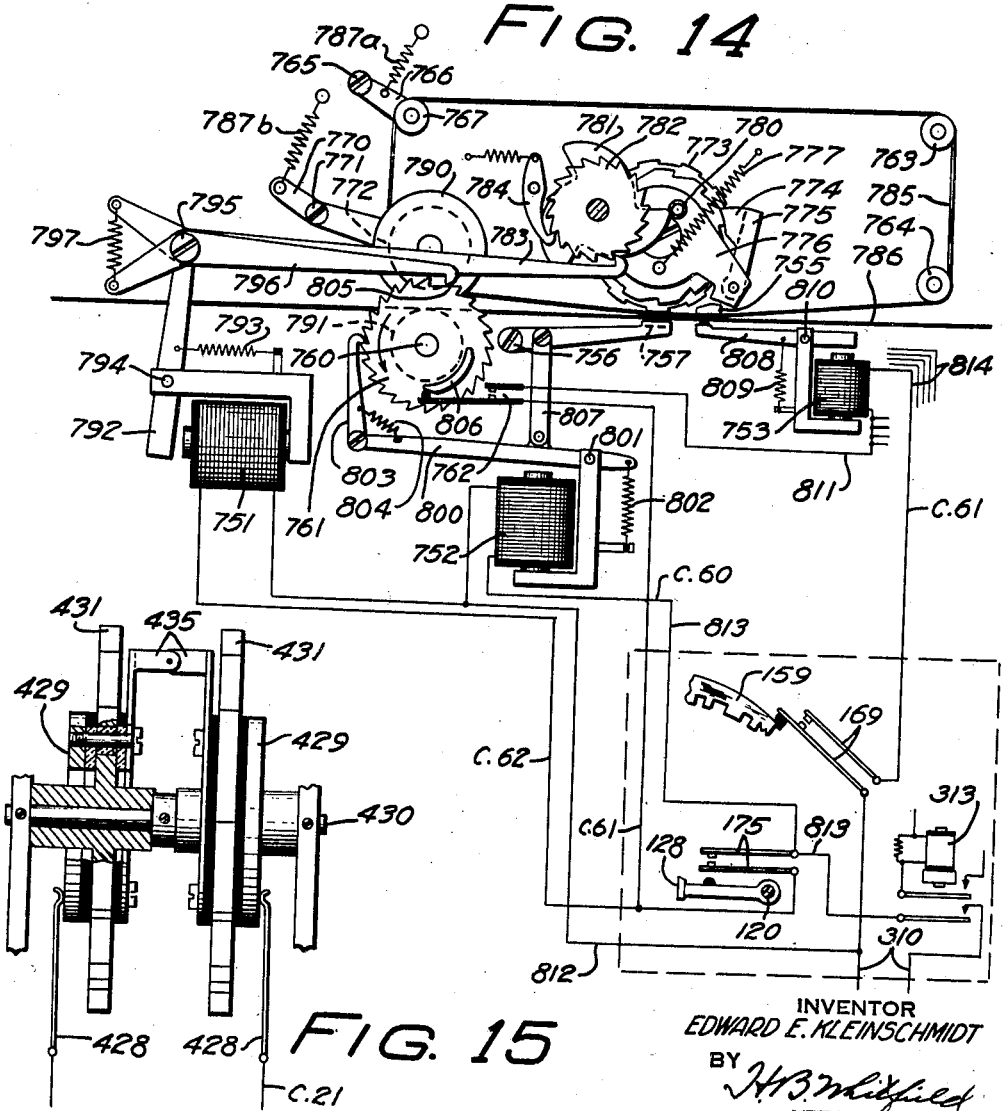
INVENTOR
EDWARD E. KLEINSCHMIDT
BY
ATTORNEY Patented Mar. 19, 1940

2,193,967

UNITED STATES PATENT OFFICE 2,193,967

AUTOMATIC MESSAGE EXCHANGE SYSTEM

Edward E. Kleinschmidt, Highland Park, Ill., assignor to Teletype Corporation, Chicago, Ill., a corporation of Delaware Application January 5, 1933, Serial No. 651,737
Renewed March 30, 1938

120 Claims. (Cl. 178—3)

The present invention pertains to methods of and means for handling telegraph traffic in a telegraph system comprising a plurality of interconnected central offices and a plurality of substations connected thereto and more specifically to an automatic telegraphic communication system.

The invention pertains also specifically to automatic receiving, routing and delivering of telegraph messages, to automatic switching of telegraph lines, to automatic selection of telegraph lines, to automatic transmission, registration and retransmission of telegraph messages over telegraph lines which have been selected automatically, to transmission of an answerback message indicating delivery of a principal message, and to recording automatically information from which traffic charges may be computed.

According to present telegraph practice in cities, a main or central telegraph office is supplemented by many substation offices which are connected to the central office by local telegraph lines equipped with automatic printing telegraph machines. These machines operate to transmit messages to the central office for retransmission therefrom over intercity lines. Such a message is received in the central office by printing upon a tape which then is assigned to an operator in charge of a line extending to its destination, and then the message is retransmitted either by operation of a keyboard transmitter or by perforating a tape which then is passed through an automatic transmitter. The printed tape is physically transported from its location of reception in the central office to the location of the retransmitting operator, and personal attention is required for the message in three separate instances; namely, by a receiving operator, by a physical carrying messenger or mechanism, and by a retransmitting operator. If a message is destined for a station located at a distant central office, the present practice is for an address operator at the distant central station to receive the message on a printed tape. The printed tape is then physically transported to a sending operator who transmits the message to the station of final destination.

The principal object of the present invention is the provision of a telegraph system arranged to facilitate and expedite the transmission of messages by the automatic establishment of communication circuits as determined by the addresses on the original messages.

A further object of the invention is to provide a system of telegraph central offices and telegraph substations equipped with automatic telegraph transmitting, receiving, recording, and retransmitting devices and with automatic line-switching devices such that the record of a message as received at its originating central office will control automatic selective devices to set up a communication circuit from that central office to the destination of the message.

Another object is to record a message in a form suitable for controlling its retransmission with the address portion thereof utilized to control automatic switches to connect a retransmitter over selected lines to the indicated destination, then retransmitting the message to the indicated destination, and then automatically returning a checking message to the point of origin to indicate the delivery of the message.

A feature of the invention is the provision of an automatically operative telegraphic checking system to increase the reliability of the transmission of the address portion of the message.

A further feature is to provide recording devices to produce records of transmitted messages from which charges for the service rendered may be computed.

A further feature is to provide means for automatically compiling and transmitting a return checking message when each principal message is received at its destination station, the return checking message being compiled automatically to comprise the signature of the principal message as an address for the return checking message and to comprise the address of the principal message as a signature for the return message.

A further feature is to route to a supervisory operator all messages having imperfect addresses or addresses not served by the provided automatic switching facilities.

The above and other objects and features of the invention are accomplished by the arrangement of a telegraph communication system involving a plurality of central offices to which are connected a plurality of branch stations and which are equipped with automatic switching mechanism permitting the automatic establishment of a communicating circuit between a branch station and its central office, and between that central office and other branch stations of a different central office. The establishment of the intercommunicating circuit between the branch station and its central office is effected through the operation of a calling key at the branch station which places that station in communication with printing telegraph apparatus, such as a reperforator located at its central office. Following this connection, the calling subscriber transmits the coded address of the called subscriber in duplicate, the body of the message, and the coded signature of the calling subscriber also in duplicate. Each of these portions is reproduced at the central station in a tape in the form of groups of perforations. This perforated tape constitutes a record form or control form for operating automatic switches to select circuits and for transmitting the message. The arrangement of the address of the calling subscriber in duplicate code formation functions with a specially designed transmitter for determining the accuracy of the perforation of the address, so that if an error appears therein a mechanism will be operated automatically for signalling an attending operator, who will receive the entire message on a receiving printer and make the necessary changes in the perforated record to permit the establishment of the originally intended communicating circuit.

Two sets of perforating apparatus are located at the central office, one for urgent and the other for deferred messages which alternatively receive the message from the branch or calling station, and which cooperate with a specially designed tape transmitter for establishing the communicating circuit to the called station automatically in accordance with the perforated address in the tape. The selection of these perforators for operation is determined by the first communication signal of the first letter of the code identified with the called subscriber.

The establishment of the communicating circuit to the called station is completed through the operation of selecting apparatus responsive to code combinations of impulses for completing circuits extending to the selector mechanisms allotted to particular branch stations within the area of the other central office or district where a final selector is operated for extending the communicating circuit to the called station. A mechanism is, of course, provided for seeking and seizing an idle trunk circuit extending between the central offices and apparatus is also arranged responsive to the selection of a busy line to indicate that condition to the operator at the central office of the originating subscriber.

If the line of the called subscriber is free, and provided an idle trunk between the central offices has been seized, the printing telegraph apparatus of the called station is connected in operative communication with the transmitting apparatus at the sending office of the originating subscriber, and the transmission of the entire message including the code address of the calling subscriber and that of the sender in duplicate is effected. Upon the completion of the transmission of the message and the transmission of special designating groups of code impulses, a mechanism responds to perforate a tape with the coded address of the original sender and that of the called subscriber, which is inserted automatically by the operation of apparatus prearranged with this address.

The thus perforated tape is subjected to a transmitter of the same general type as that by which the original message was transmitted, and coded impulses representative of the coded address of the calling and called subscribers will be transmitted to the calling subscriber over connections established automatically which will be received by the calling subscriber and serve as an indication that the message has been transmitted to and received by the called subscriber.

To provide for the automatic recording of messages from which service charges may be quickly and readily determined, a counting mechanism including printing elements is provided at each subscriber's station for automatically recording the address and the number of words included in each message. From such a record the charge for services rendered in the transmission of the message may be computed.

A better understanding of the invention may be had from the following description, taken in conjunction with the accompanying drawings, wherein, Fig. 1 shows a diagram of the arrangement of circuits and apparatus of the system of this invention;

Fig. 2 shows a tape perforated with an address and part of a message for urgent transmission service;

Fig. 3 shows a tape, perforated with an address and part of a message for deferred transmission service;

Fig. 4 shows circuits in detail for the equipment of a subscriber line adapted to call the central office and adapted to be called from the central office;

Fig. 10 shows circuits of a final selector;

Fig. 11 shows an arrangement of other figures to produce a complete circuit diagram in which Fig. 4 appears at the left of Fig. 5 to show the calling substation and appears again dotted at right of Fig. 10 to show the called substation;

Fig. 12 shows circuits for an extended trunk to another office in the same district;

Fig. 13 shows plan view of parts of an accounting device;

Fig. 14 is an elevation and view of parts of the accounting device with detail of electrical circuits and, Fig. 15 shows mechanical detail of a message indicating device.

GENERAL SYSTEM FOR THE DISTRIBUTION OF MESSAGES

Fig. 1 is a diagram showing an arrangement of several types of switches used in transmitting a message from one substation to another substation within one central office and indicating trunk circuits for transmission of similar messages addressed to substations in other central offices in the same district as well as in other districts.

Figure 5:
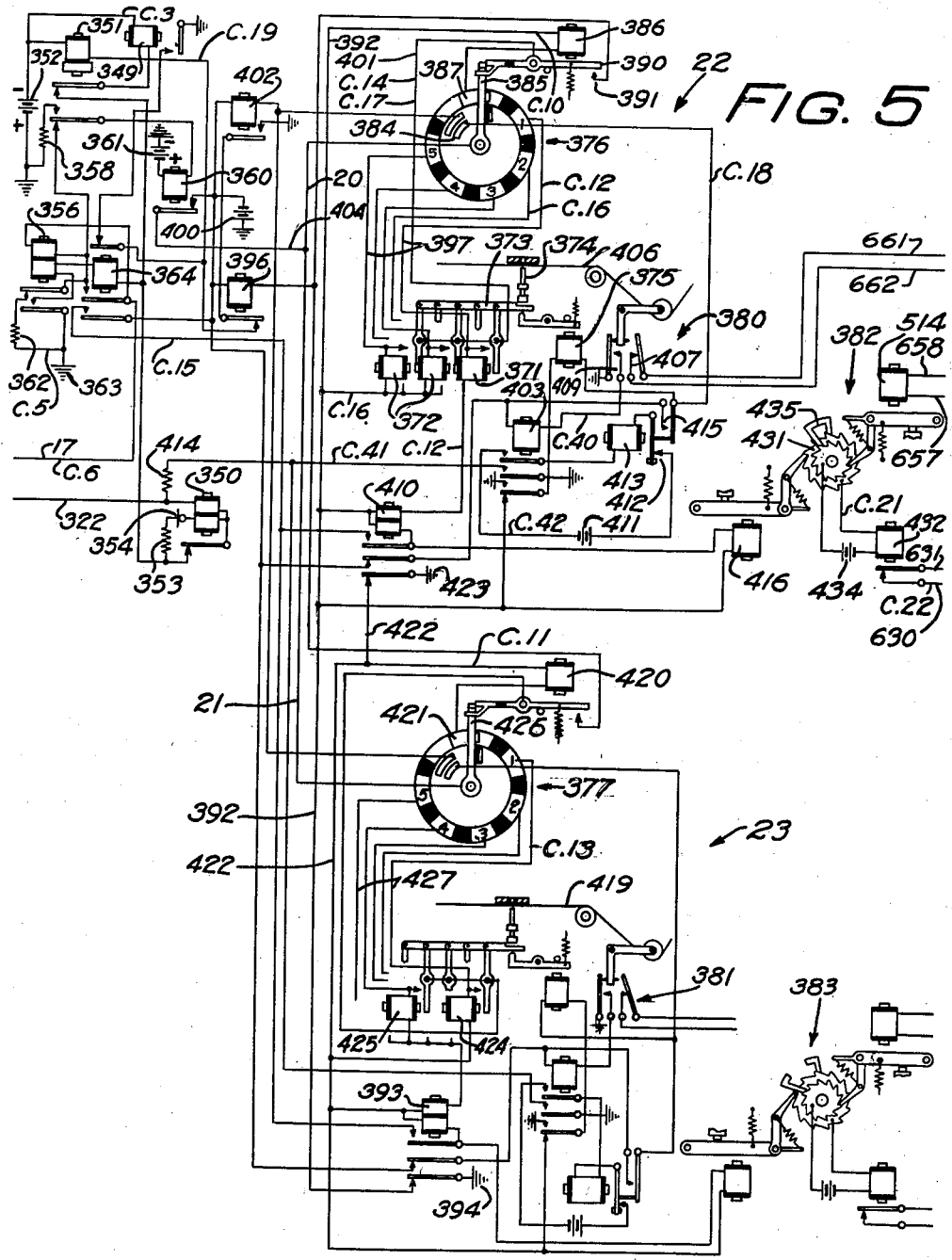
Fig. 5 shows circuits in detail for the two alternative perforators, including message indicators.

In Fig. 1, substations 10, 11, and 12 each has a receiving printer 13 and a transmitter 14 shown diagrammatically, the circuits of which are shown in detail in Fig. 4. Each substation is connected by a line wire 15, 18, and 19 to an automatic trunk-finder switch 16, also shown in Fig. 4. Trunks 17 are communication wires which may be selected by the switch 16 and each trunk 17 is connected by wires 20 and 21 to two perforators 22 and 23. The details of these perforators and the selective circuits and devices for rendering one or the other of the perforators operative are shown in Fig. 5.

Each perforator is associated with an address transmitter 24 for retransmitting the address portion of the message and a message transmitter 25 for retransmitting the entire message, comprising address, body, and signature portions of the message. Each assembly of perforator and two transmitters, as 22, 24, and 25, has permanently associated with it an automatic trunk selector 26 or 27, which are shown in detail in Figs. 6 and 7 respectively.

Each of the selectors 26 responds to signals from the address transmitter 24 to set up a selective condition by which, first a group of trunks leading to a common destination is selected, then an idle trunk in that group is selected and seized, and the two transmitters 24 and 25 then are associated with the seized trunk and with its remote selector in a manner permitting the operation of the seized trunk and remote selector under control of the transmitter 24. Thus the perforator 22 and its transmitter 24 are adapted to operate their associated first selector 26 to seize a second selector 34 or 36, to operate the second selector to seize a third selector 40 or 42, to operate the seized third selector to seize a fourth selector 44, to operate the seized fourth selector to seize a fifth or final selector 50 or 52, and to operate the seized final selector to seize one of the three lines 15, 18, and 19 leading to the three substations 10, 11, and 12, respectively. The perforators and selectors here mentioned, all of which have been given labels of even numbers, are assigned to the service of urgent messages.

There is provided also separate equipment, perforator 23, Fig. 1, and associated transmitters, for service of deferred messages. Transmitter 24 of the set 23, 24, and 25 is adapted to operate its associated first selector 27 to seize a second selector 35 or 37 to operate the seized second selector to seize a third selector 41 or 43, to operate the seized third selector to seize a fourth selector 45, to operate the seized fourth selector to seize a fifth or final selector 51 or 53 and to operate the seized final selector to seize one of the three lines 15, 18, or 19 leading to the three substations 10, 11, and 12, respectively. The perforators and selectors here mentioned as assigned to the services of deferred messages have been given labels of odd numbers. The first, second, third, fourth, and final selectors are alike. Each final selector contains an answerback device 54.

To give preference to urgent messages over deferred messages in the system herein described, it is proposed that central office attendants will assign sufficient trunk circuits both within the central offices and those connecting central offices to urgent message transmission always to carry the traffic load without delay. When the urgent traffic is heavy, the excess of deferred messages will be held in the form of perforated tape at the transmitters until decreasing traffic in urgent messages will permit the manual switching of trunk circuits to carry deferred messages. Keys 155, Fig. 1, are for the purpose here described. While these keys are open, the trunks 60 and 61 may serve urgent messages only. While these keys are closed, the trunks 60 and 61 may serve both urgent and deferred messages. The keys 155 may contain contacts to make the trunk-terminals busy-by-test in the selectors 35 and 37 while the switches are open, as shown at 155 in Fig. 7.

Figure 7:
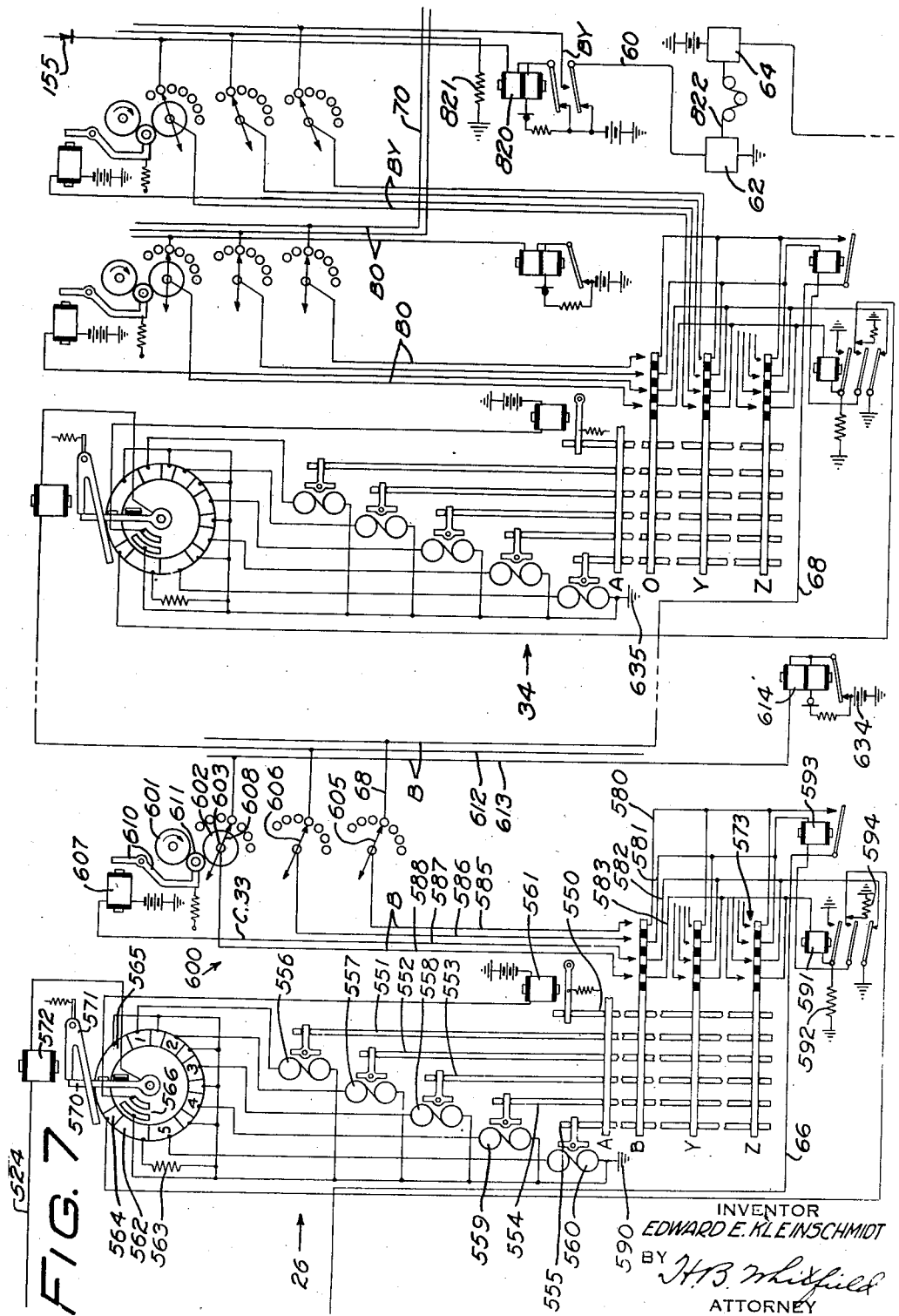
Fig. 7 shows circuits of first and second selectors and indicates circuits for trunking to other central offices in distant districts.

The trunk 60 is provided with home communicating apparatus 62 and 64 and is connected with receiving apparatus 82 in another central office in a distant district. Details thereof are shown in Fig. 7. Trunk 61 is similarly equipped. Trunk 58 extends through home communicating apparatus 56 to receiving apparatus 156 in a nearby central office in the same district, Fig. 12, and trunk 59 for deferred messages is similarly equipped.

GENERAL OPERATION

Assume that an operator at substation 10, whose telegraphic address is BOTIK, desires to send an urgent message to station 12, whose telegraphic address is BOTIF for urgent messages. The operator depresses a calling key 301 at substation 10, switch 16 responds in a well known manner and selects trunk 17 and its two perforators 22 and 23. A starting signal is shown at station 10 and the operator proceeds to transmit the message. The two perforators 22 and 23 register the first signal of the letter B, and as the letter B is indicative of an urgent message and not a deferred message, selective devices associated with the perforators 22 and 23 operate to render the deferred perforator 23 inoperative during the remainder of the message. The perforator 22 records address, body, and signature upon its tape. The operator then sends a message-end signal of "blank code" and central office apparatus acts to release calling line 15.

Beginning under control of the message-end signal code in the perforator 22, address transmitter 24 acts over trunk 66 Fig. 1, to register letter B upon the selector 26 and to connect transmitter 24 to trunk 68 of B group of trunks for urgent messages. The address transmitter 24 then acts over trunk 66 through selector 26 and over trunk 68 to register letter O upon selector 34 and to connect the trunk 68 to trunk 70 of BO group of trunks. The address transmitter 24 then acts over trunks 66, 68, and 70 to register letter T upon selector 40 and to connect the trunk 70 to trunk 80 of BOT group of trunks. The address transmitter 24 then acts over trunks 66, 68, 70, and 80 to register letter I upon selector 44 to connect the trunk 80 to trunk 72 of BOTI group of trunks. The address transmitter 24 then acts over trunks 66, 68, 70, 80, and 72 to register letter F upon final selector 50 to connect the message transmitter 25 of perforator 22 to line wire 19 and to substation 12 as identified by the address code BOTIF. The message transmitter 25 receives a signal that substation 12 is in condition to receive a message and immediately the message transmitter 25 sends the full message comprising address, body, and signature to the substation 12.

Figure 9:
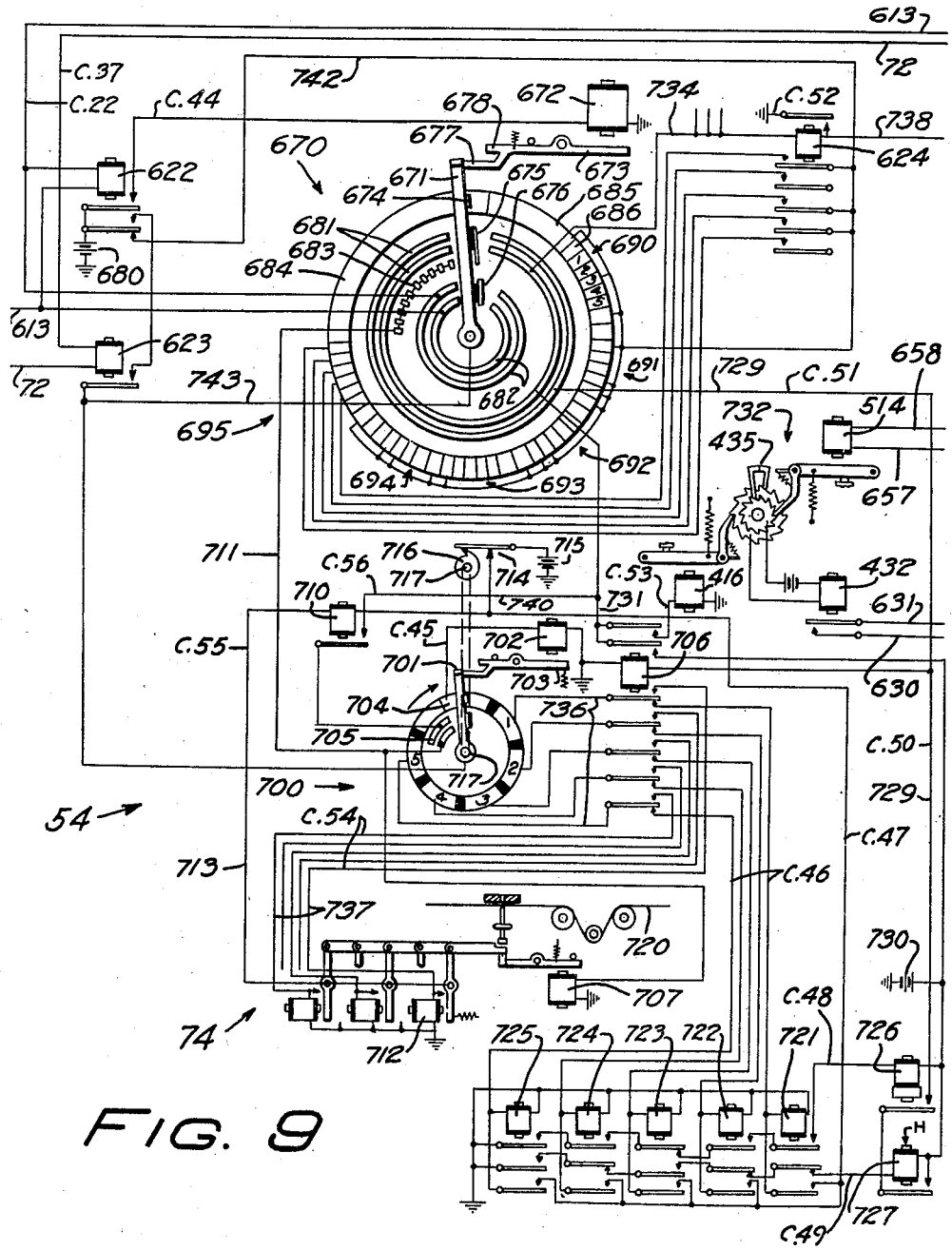
Fig. 9 shows circuits of an answerback system.

In the final selector 50 is an answerback device 54 shown in detail in Fig. 9, which is responsive to a signal code which precedes the signature. When this device is actuated, it operates to record the signature of the message, then to act as a sender to send to a perforator 74 a message comprising the recorded signature BOTIK as an address and the directory number BOTIF of the connected line 19 as a signature. The transmitters 73 and 75 then control selectors 76, 34, 40, 44, 50 or similar selectors to select line wire 15 to substation 10 and a checking message "BOTIK BOTIK BOTIF" is printed at substation 10 to indicate delivery of the principal message at substation 12.

A record of the message for accounting or service charging purposes is made by a substation device not shown in Fig. 1 but shown in detail in Figs. 13 and 14.

THE SUBSTATION AND ITS FINDER SWITCH

At the substation 10, Fig. 4, are telegraph sending contacts 14 and receiver magnet 13, shown diagrammatically. Symbol 14 may represent a transmitter of any kind, either keyboard contacts or automatic contacts controlled by a perforated tape. A motor 300 is provided for driving printer and transmitter. There is provided also a calling key 301 having five contacts. The key 301 is adapted to be operated manually and to be held in operated position by a latch 302 which is also an armature of magnet 303. The latch 302 has an electrical contact 304 which engages to close a circuit when attracted by magnet 303. The magnet 303 is polarized and operates only when positive battery 361, Fig. 5, at the central office is connected to line 15. Motor 300 has a pair of contacts 305 which are closed only when the motor is operated at full speed and which are connected to terminals of resistance 306.

A relay 307 has its winding connected in circuit C.2, from power mains 310 through winding of relay 307, and through top contacts of key 301 to mains 310, and has its armature and contact connected in parallel with the keyboard contacts 14.

An alternating current relay 311, adapted to respond to current of 135 cycles, has its winding connected in circuit C.36 from line wire 15 through magnet 13, a condenser 312, and contacts of key 301 to ground 316. It has its upper armature and contact connected in a branch of circuit C.37 from line 15 through magnet 13, contacts 14, a resistance 306, winding and shunt 315 of a relay 313, upper armature and contact of the relay 311 and contacts of key 301 to ground, and has its lower armature and contact connected in circuit C.8 from the right-hand wire of the power mains 310, through the lower armature and contact of relay 311, and through the winding of a relay 314, a manual key 321, an audible-signal device 317, and a lamp 320 to the mains 310. The circuit C.8 also may be completed through armature 302 of magnet 303 and its contact 304.

Relay 313 is of slow-to-release type, with its winding shunted by a non-inductive resistance 315, and has its winding connected in circuit C.1, to the line wire and a contact of key 301. Its upper armature and front contact are connected to the fourth and fifth contacts of the key 301. Its lower armature and front contact are connected to the right-hand wire of the power mains 310 and to one terminal of the motor 300 whose other terminal is connected to the left-hand wire of the mains 310.

When the key 301 is operated, its first contact engages its second contact and its fourth contact leaves its third contact and engages its fifth contact. The contacts of relay 314 are connected in circuit C.9, from power mains 310 through contact and lower armature of relay 313, the armature and contact of relay 314 and winding of relay 314, then as C.8 to the mains 310. The winding of magnet 303 is connected in circuit C.1, from the fourth contact of key 301 to ground 308. The line wire 15 connects the substation 10 to apparatus at the central office.

At the central office, an automatic switch 16 is individual to each line 15 and is adapted to connect the line 15 to an idle trunk, such as trunk wire 17 and its companion test wire 322. Switch 16 has two brushes which are driven by a ratchet 323 and a pawl 324 and an armature of a magnet 325, which has a return spring 326 and a pair of contacts 327.

Each line 15 has also seven relays, a switch relay 330 for controlling switch 16, a holding relay 331 for controlling a test relay 332 during transmission of a message, a test relay 332 for detecting an idle trunk test wire when the switch 16 is searching, a relay 333 for detecting a busy-by-test condition of line 15 when line 15 has been selected by a final selector, to be described, a relay 334 for cutting off switch 16 and its apparatus from line 15 after the line 15 has been seized by a final selector, a shunt relay 335 for shunting a choke coil 336 which is needed in setting up communication but is not needed after communication has been established, and a slow relay 366 for delaying restoration of line 15 to its battery 337 after the line has been released by relay 334 or by relay 331. Battery 337 is common to a number of lines and is connected with its negative pole with the lines and its positive pole to ground. A grounded ringing generator 338 is connected in circuit C.36 through a condenser 339, normally open contacts of relay 334 and closed contacts of relay 335 to line 15, thence to ground 316 as described above.

The battery 337 is connected in circuit C.1, through winding of relay 330, operating winding of relay 331, and closed contacts of relays 366 and 332 to the line wire 15, thence through magnet 13, contacts 14, resistance 306, winding and shunt of relay 313, lowest two contacts of key 301 normally open, and winding of magnet 303 to ground 653. The armature and front contact of relay 330 are connected in circuit C.4, with a battery 340 and winding of magnet 325. The contacts of the magnet 325 are connected to the ends of the winding of the relay 330 to shunt this relay when the magnet 325 has attracted its armature. The holding relay 331 has its armature and contact connected in circuit C.3, from test wire 322, contact 365 and brush 323, through the armature and contact and then through lower or holding winding of relay 331, lower winding of relay 366, winding of test relay 332, a resistance 341 and lower contact and armature of relay 333 to ground 342. Relay 332 has its top front contact connected to the communication brush of switch 16. Its middle armature and front contact are connected to the terminals of resistance 341 to shunt that resistance. Its bottom armature and back contact are connected in busy-test circuit C.35, to be described.

Associated with test wire 33 of each trunk 17 is a test-control relay 350, Fig. 5. This relay has an upper or operating winding of 100 ohms connected in circuit C.3, from negative pole of grounded battery 352, Fig. 5, winding of a slow-to-operate relay 349, upper armature and back contact of relay 351, back contact and armature of the relay 350 and then through the upper winding of relay 350 to wire 322 and thence as described above for circuit C.3 to ground 342, Fig. 4. Relay 350 has a second winding of 1000 ohms, an external resistance 353 of 1000 ohms, and a dry copper oxide valve 354 whose resistance is 50 ohms when traversed by current from the battery 352, but is 5000 ohms when traversed by induced current from the lower winding of the relay 350 in response to the beginning of current in the upper winding of relay 350. The three elements 353, 354 and the lower winding of the relay 350 are connected in series and the terminals of the series are connected to the armature and back contact of relay 350 so that the three series elements are shunted when the relay 350 is unenergized. The presence of the valve 354 reduces the induced local current and increases the speed of response when the relay 350 is operated by current through its upper winding.

Trunk wire 17 is connected in the primary communication circuit C.6, from positive pole of grounded battery 361, through winding of repeating relay 360, through contacts of relay 351 and through winding of relay 356 to wire 17, contact 355, Fig. 4, brush of switch 16, front contact and top armature of relay 332, line 15 and over circuit C.1 to ground 316. Relay 356 has its upper winding terminals connected to upper armature and contact of relay 364, which has its lower armature and front contact connected in circuit C.15 to be described. Relay 356 has its lower or holding winding connected in circuit C.7, from contact of relay 351 in circuit C.3, through winding of relay 364, winding of relay 356, through the front contact (normally open) and lower armature of relay 356 to ground 363.

OPERATION OF THE FINDER SWITCH

In this description, the elapsing time is divided into numbered intervals. The circuits also are numbered for easy identification.

*Time 0—All apparatus in condition of rest*

The circuit C.1 of the line 15 extends from battery 337 through relays 330 and 331 at the central office, and is open for direct current at condenser 312, at the armature of relay 313, at the armature of relay 311, and at the fifth contact of key 301 at substation 10.

*Time 1—Initiating a message*

The latching calling key 301 at the substation 10 in Fig. 4 is closed manually, is latched and closes circuits C.1 and C.2, described above, the circuit C.1 being extended to ground 308 through contacts of operated key 301 and winding of magnet 303.

Battery 337 produces in circuit C.1 a current of 10 m. a. which energizes relays 330, 331, and 313 but not printer magnet 13 because the current is too weak, nor magnet 303 due to the connected negative terminal of battery 337.

Relay 313 in operating closes and shunts the fourth and fifth contacts of key 301, and connects the power mains 310 to the motor 300. When motor 300 attains its operating speed contacts 305 are closed to shunt resistance 306. Energy from the power mains 310 produces in circuit C.2 a current to operate relay 307 whose contacts shunt the keyboard contacts 14 so that circuit C.1 may be completed through the contacts of the relay 307 in case the contacts 14 be open.

*Time 2—The period of search*

Relays 331 and 330 have closed circuit C.3 and circuit C.4, respectively.

When the tested trunk wire 322 is idle as shown in Fig. 5, the resistance of circuit C.3 is 100 ohms in relay 349, 100 ohms in relay 350, 500 ohms in relay 331, 500 ohms in relay 366, 500 ohms in relay 332 and 1000 ohms in resistance 341, or a total of 2700 ohms, and the battery 352 of 110 volts produces an operating current of 40 m. a., sufficient to operate the relays 349, 350, 366, and 332 and to hold the operated relay 331. The slow-to-operate relay 349 will close its contacts effectively only when the motor 300 does not reach its maximum speed within a predetermined time limit.

Should switch 16 at this instant be holding test relay 332 connected through to an idle trunk test wire 322, relay 332 and relay 350 will be energized by current in circuit C.3, and the upper armature of relay 332 will interrupt circuit C.1 to release relay 330 to open circuit C.4 before magnet 325 has had time to step switch 16. Relays 332 and 350 jointly will render the trunk wire 322 busy-by-test. Should two testing relays 332 test the trunk wire 322 simultaneously, the resultant resistance of circuit C.3 would be 1450 ohms and the current would be 75 m. a. This is nearly double the normal current of relay 350 which would operate quickly and reduce the current through the two relays 332 neither of which would operate, and the search would continue as described below.

When a tested trunk wire 322 is busy-by-test, the resistance of circuit C.3 while being tested is 100 ohms in relay 349, 1000 ohms in resistance 353, 50 ohms in valve 354, 1000 ohms in lower winding of relay 350, 100 ohms in upper winding of relay 350, 500 ohms in winding of relay 331, 500 ohms in winding of relay 366, and 500 ohms in winding of relay 332 at the finder switch 16, which is using the busy trunk. Connected in shunt of the last 1500 ohms above listed are elements 331, 366, 332, and 341 at the switch 16 which is testing the busy trunk. The resulting resistance of the total circuit C.3 is 3187 ohms and battery 352 of 110 volts produces a current of 35 m. a. of which the testing relay 332 receives but 13 m. a. which is sufficient to hold relay 332 when operated, but relay 332 does not operate at this time to open circuit C.1 and the relay 330 remains energized and holds circuit C.4 closed.

Magnet 325, energized over circuit C.4, attracts its armature and by the armature movement it drives the brushes of switch 16 into engagement with the next test contacts 355 and 365 thereof.

Should the second trunk be busy-by-test, relay 332 will not be operated. Contacts 327 operated by the armature of magnet 325 will shunt the winding of relay 330, thus deenergizing the relay 330 whose contacts then will open and will deenergize the magnet 325 thus opening the contacts 327. Again relay 330 will become energized to repeat the cycle to advance the brushes of the switch 16. When the brushes of the switch 16 engage a wire 322 which is not busy-by-test, test relay 332 will receive 40 m. a. and will operate its armatures. Its lower armature and back contact will remove battery 345 from test wire 650 for incoming messages and will render line 15 busy-by-test.

In the condition of rest (Time 0) circuit C.5, from battery 361, winding of relay 360, lower armature and back contact of relay 351, upper armature and back contact of relay 356, resistance 362, to ground 363, has held repeating relay 360 energized.

The top armature and front contact of operated test relay 332 now close the primary communication circuit 6, but temporarily it is through magnet 303 to ground 308.

Current through the upper winding of relay 356 energizes the relay to operate its armatures. Its upper armature opens circuit C.5 and removes resistance 362 from circuit C.6 and its lower armature closes the holding circuit C.7 thereby operating relay 364. Relay 364 shunts the operating winding of relay 356 from circuit C.6 but relay 356 is maintained energized by current in circuit C.7. Repeating relay 360 now is controlled by keyboard contacts 14 over circuit C.6.

Magnet 303 unlatches key 301 which returns to normal position. Contacts in key 301 now shunt the winding of magnet 303, while other contacts thereof open circuit C.2 and deenergize relay 307.

Energization of magnet 303 has closed momentarily contact 304 to energize relay 314 over circuit C.8. Relay 314 holds by current over circuit C.9, lamp 320 glows and device 317 produces an audible signal. This is a signaling condition which notifies the operator of the substation 10 that the line is connected for transmission of a message. The same device will give an alarm when a message is received. The operator now opens key 321 momentarily to discontinue the signals.

The system now is in condition for transmission by the operator at substation 10, using keyboard contacts 14. Without normal speed in motor 300, contacts 305 remain open, current in line 15 is below normal and printer magnet 13 will not respond. This constitutes an automatic signal to the operator that transmission is not being effected.

Calling station 10 sends the first letter. Signals enter the central office over circuit C.6 and operate repeating relay 360. Assume an "urgent" message whose first address letter is "B" as shown in Fig. 2.

THE PERFORATOR SYSTEM

For each trunk 17, Fig. 5, there are provided two perforators 22 and 23 of signal-controlled type in which perforation of a tape is effected with holes arranged in code formation to represent electrical signals which have been received in code manner by the perforator system. Such a device is described in United States Patent 1,884,743, granted October 25, 1932, to E. E. Kleinschmidt. Such a device comprises five signal receiving magnets 371, 372 which operate five punch control fingers 373 which control five code punches 374 with which is associated a fixed punch for feeding holes. A power magnet 375 operates the punches after code combinations have been set upon magnets 371, 372.

With each perforator 22 and 23 is provided a distributor 376, 377, a tape follower switch 380, 381 and a message indicator 382, 383. These mechanisms are associated by circuits and relays, all organized to be controlled primarily by the repeating relay 360.

Distributor 376 has a stop segment 387, five code segments, a local switch 384, and a brush arm 385 with its brushes adapted to engage the segments and the local switch. Starting magnet 386 is normally energized to hold its armature 390 attracted. Armature 390 has an electrical contact 391 and has two mechanical stops for brush arm 385, a short-end stop for stopping the brush arm in normal position as shown and effective when the armature is in its attracted position, and a long-end stop for stopping the brush arm in a pre-normal position. In each of these positions the brush arm engages the stop segment 387 and is disengaged from local switch 384.

Start magnet 386 is connected in circuit C.10 to stop segment 387 and arm 385 over wires 20 and 404 and contacts of relay 360 to battery 400, and also over a common wire 392 through bottom contacts of relay 393 to ground 394. Start magnet 420 is connected similarly in circuit C.11, from battery 400, contacts of relay 360, wires 404 and 21, arm 426, segment 421 and then wire 422 and contacts of relay 410 to ground 423. The five code segments of distributor 376 are connected in circuits C.12 and C.16 by individual wires 397 to corresponding magnets 371 and 372, then to wire 392 for magnets 372 or through winding of relay 40 to wire 392 for magnet 371. Contact 391 and armature 390 of magnet 386 are connected in circuit C.14 through winding of relay 396 to battery 400 and over wire 401 to all armatures of perforator magnets 371 and 372, thence through circuits C.12 and C.16 to ground 394. Switch 384 is connected on one side through winding of test relay 402 to battery 400, and on the other side to winding of perforator power magnet 375 and through the bottom contacts of blanking relay 403 to common wire 392 and ground 394, thus forming circuit C.18.

Tape follower switch 380 when in normal position with tape 406 slack as shown, comprises normally closed contacts 407 connected in circuit C.39, to be described, and normally open contacts 409 connected to ground and to winding of relay 403 which is connected through middle contacts of relay 410 to battery 400, thus forming circuit C.40. The top armature and contact of relay 403 are connected in circuit C.42 with battery 411, interrupter contacts 412 on magnet 413 and the winding of magnet 413, and the middle armature of this relay is connected to ground with its front contact thereof connected through resistance 414 to the trunk test wire 322, forming a branch path for busy-test circuit C.3. Vibrator magnet 413 has also a pair of contacts 415 operated by its armature and connected through winding of power magnet 375 and through lowest armature of relay 403 and its front contact to ground, and connected also through middle contacts of relay 410 to battery 400, thus forming circuit C.43 when relay 403 is operated. These contacts are normally open and are closed when the magnet 413 attracts its armature. Relay 410 has a lower locking winding which is connected from grounded wire 392 and through its own upper armature and contact and through the lower contacts of relay 364 to battery 400, to form circuit C.15, which when formed holds the relay 410 energized through the transmission of the complete message. Magnet 416 also is included in circuit C.15 in parallel with the holding winding of relay 410.

As shown in Fig. 15, a message indicator 382 includes a fixed shaft 430 which carries two rotatable ratchets 431, each of which carries one contact of the pair 435 and a collector ring 429. Contacts 435 and rings 429 are assembled upon ratchets 431 with insulating rings and bushed screws. Brushes 428 engage collectors 429 and are connected to battery and to the winding of relay 432, Fig. 5, forming circuit C.21.

Perforator 23 is identical with perforator 22 except in the circuit connections, which are reversed in two details. In perforator 22, current through first magnet 371 (C.12) energizes control relay 410 while in perforator 23, current through first magnet 424 does not energize relay 393 corresponding to relay 410. In perforator 22, current through magnets 372 (C.16) does not energize relay 410 while in perforator 23, current through magnets 425 will energize relay 393. Discrimination thus is effected between urgent messages and deferred messages. An urgent message (Fig. 2) will operate relays 371 and 410 to remove ground 423 from wire 422 and from all operating circuits of perforator 23, thus disabling perforator 23 and permitting perforator 22 to record an urgent message, while a deferred message (Fig. 3) will not operate relays 371 and 410 but will operate a relay 425 and relay 393 to remove ground 394 from wire 392 and from all operating circuits of perforator 23, thus disabling perforator 22 and permitting perforator 23 to record a deferred message.

Cut-off relay 351 has its winding connected to battery 352 and also through the contacts of detector relay 396 and contacts of message-end test relay 402 to ground, forming release circuit C.19.

OPERATION OF PERFORATOR SYSTEM

Assuming that calling station 10 has been connected to repeating relay 360 over circuit C.6, and that the first letter of the address is B, the operation will be as follows:

Time 3—Selecting the perforator

In idle condition of waiting, the two perforators 22 and 23 have their starting magnets 386 and 420 continuously energized over circuits C.10 and C.11 for the urgent and deferred messages.

A starting impulse preceding a code for letter B deenergizes repeating relay 360 and interrupts both circuits C.10 and C.11, deenergizing both start magnets 386 and 420, and releasing both brush arms 385 and 426 in both perforators 22 and 23. The first signal of code for letter B is a marking signal which energizes repeating relay 360 and operates it to close its contacts. At this instant the arms 385 and 426 are in engagement with their No. 1 segments and circuit C.12 is completed.

Relay 410, energized by current in circuit C.12, operates its armatures to interrupt all operating circuits in perforator 23. Relay 410 and magnet 371 close holding circuits C.14 and C.15, but the movement of the armature of magnet 416 is without effect at this time.

Time 4—Perforating

To perforate tape 405 in accordance with letter B, repeating relay 360 is unenergized while brush arm 385 engages its No. 2 and No. 3 segments but is energized while it engages No. 1, No. 4, and No. 5 segments forming circuits C.12 and C.16 and energizing magnets No. 1, No. 4, and No. 5 of code magnets 371 and 372. No corresponding circuits are completed in perforator 23. Each operated code magnet forms its holding circuit C.14, thus registering upon the set of magnets 371 and 372 the code for letter B.

Brush arm 385 closes circuit C.18 through switch 384 as traced above to operate magnet 385. Magnet 375 operates its armature thereby perforating tape 406 by punch pins 374 with the code of letter B and the mechanism of the perforator steps the tape 406 into position for a succeeding perforation, as is fully described in the patent referred to.

Brush arm 385 of perforator 22 engages segment 387 and closes circuit C.10 to energize magnet 386 and brush arm 385 then stops in its normal position in mechanical engagement with the short end of armature 390. Brush arm 426 in perforator 23 engages segment 421 but does not close circuit C.11 to energize magnet 420 because common wire 422 is open in relay 410. Brush arm 426 therefore stops in mechanical engagement with the long end of the armature of magnet 420 and remains in that position until circuit C.11 is closed by deenergization of the relay 410 at the end of a message.

Reenergization of starting magnet 386 moves armature 390 from its contact 391 and interrupts holding circuit C.14, deenergizing detector relay 396 and deenergizing all magnets 371 and 372. This completes the cycle of the first letter, leaving relay 410 and magnet 416 energized by circuit C.15, brush arm 426 off-normal and common wire 422 open in relay 410.

Time 5—Subsequent codes except "blank" code

Each subsequent code repeats the operations of time 3 and time 4, except that relay 410 remains operated, magnet 416 remains operated and brush arm 426 is not started. The operator at substation 10 transmits the duplicate address, the message body, an answerback cut-in signal code, and a duplicate signature comprising in duplicate the directory code of the substation 10, then sends "blank" code as a message-end signal.

Time 6—Message-end signal

In response to "blank" code, a starting impulse releases relay 360 which opens circuit C.10, and brush arm 385 starts, engaging segments Nos. 1 to 5 successively, but contacts of relay 360 are open for all five signals in "blank" code and no current flows in circuit C.12 or circuit C.16 to energize any magnet 371 or 372 nor is detector relay 396 energized. Brush arm 385 closes circuit C.18 to operate magnet 375 and message-end test relay 402. The tape is then advanced one step to present an unperforated area of tape opposite punch pins 374 and contact of relay 402 closes message-end circuit C.19 momentarily. Relay 351 is energized and when operated it holds its armatures two seconds after current ceases.

Repeating relay 360 is maintained energized by a circuit through contacts of relay 351 and resistance 358 to ground. Communication circuit C.6 is opened at the lower armature of relay 351 thus deenergizing relay 313 at substation 10. Circuit C.3 is opened at the upper armature of relay 351, thus deenergizing relays 349, 350, 331, 366, 332 of circuit C.3 and relays 364, 356 of the associated circuit C.7. Slow-to-release relay 366 holds line 15 open from battery 337, after relay 332 has released its top armature and until after slow-to-release relay 313 has released its armature.

After one-quarter second from operation of relay 351, relay 313 releases its armatures. Motor 300 stops and an accounting device, Fig. 14, operates.

After one-half second from operation of relay 351, relay 366 releases its armature, thereby restoring line 15 to normal condition of idleness.

Two seconds after operating, relay 351 releases its armatures. The upper armature and back contact close test circuit C.3 to render trunk 17 and its wire 322 idle-by-test.

Deenergization of relay 364 opens holding circuit C.15 deenergizing relay 410 and magnet 416. Deenergization of relay 410 connects wire 422 to ground 423 and closes circuit C.11 to energize magnet 420 to permit brush arm 426 to advance to normal position. Deenergization of magnet 416 permits its armature and pawl to drive ratchet 431 one step and thus separate the contacts 435 and open circuit C.21 to deenergize relay 432.

RETRANSMISSION APPARATUS

Figure 6:
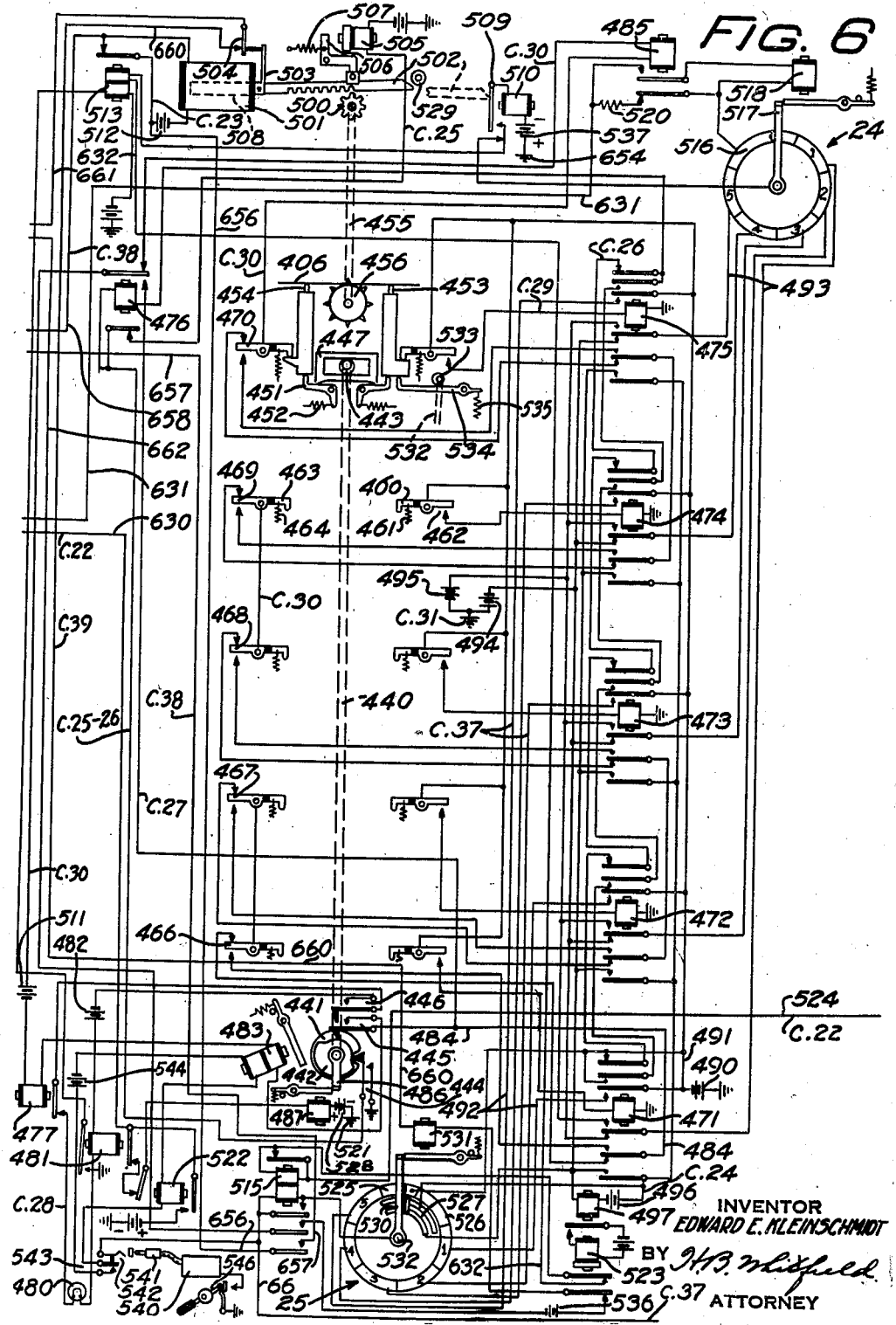
Fig. 6 shows circuits in detail of address and message transmitters, a tape return device and circuits to a correction desk.

For checking codes of a repeated address for accuracy, a double tape-reader is provided to read the two parts of a repeated address simultaneously and to compare the two readings (Fig. 6). A friction driven shaft 440 carries contact-operating cams 441, 442 and a cam 443. Cam 441 operates contacts 444 to close when cam 441 is off normal, and cam 442 operates contacts 445 and 446 to close when cam 442 is from 45° to 190° of rotation. Cam 443 operates cam follower 447 to lift it from ten bellcranks 451 operated by springs 452 so that a set of five principal feelers 453 and a set of five auxiliary feelers 454 cooperate with tape 406 which was previously perforated by the mechanism 22, Fig. 5. The distance between sets of feelers is such that perforations for two first letters of the repeated address may be engaged by two sets of feelers at the same time. Another shaft 455 with a feed wheel 456 steps tape 406 for each operation. When any principal feeler 453 passes through a perforation in tape 406 it operates a rocker, such as 460, against tension of its spring 461 to close a switch 462, closing circuit C.29 from battery 490 to ground, to operate one of five multi-contact code relays 471, 472, 473, 474, and 475. When any auxiliary feeler 454 passes through a perforation in tape 406 it operates a rocker, such as 463, against tension of its spring 464 to reverse one of five switches 466, 467, 468, 469, and 470. Each of these switches has its two contacts connected in circuit C.30 to be described, to contacts of a fifth armature of a corresponding code relay 471 to 475. Cam contacts 444 are connected from ground through the winding of a transmission cut-out relay 476, and through contacts and all first and second armatures of all code relays 471 to 475 to battery 490, forming circuit C.26, also through lower armature and contact of relay 476 and through winding of magnet 505 to battery and ground, forming circuit C.25, while cam contacts 446 are connected in circuit C.28 with contacts of a relay 477, lamp 480, winding of relay 481 and battery 482, and cam contacts 445 are connected in circuit C.30, over wire 484, through all fifth armatures of code relays 471 to 475, and through all switches 466 to 470, through the winding of test relay 485, the upper back contact and armature of relay 476, battery 511, winding of relay 477 and right-hand winding of magnet 483. A branch wire connects wire 484 to the front contact of relay 476, forming a shorter circuit C.27, containing only the contacts of relay 476, battery 511, winding of relay 477, a winding of magnet 483 and contacts 445. Shaft 440 also carries stop arm 486 which is stopped at normal position by an armature of a switching start magnet 487 but is cleared when magnet 487 is energized to attract its armature. Arm 486 may be stopped at its 60° position by an armature of stop magnet 483 but is cleared when magnet 483 is energized to attract its armature. Shaft 440 advances feelers 453 and 454 to test tape 406 during the first 45° of its cycle and during the last 170° of its cycle it withdraws the feelers and operates shaft 455 to step tape 406.

In each code relay 471 to 475, its third armature is the message transmitting armature in circuit C.37, and is connected over common wire 491 to the battery 490 and each such armature has its front contact connected over an individual wire 492 to a corresponding segment of distributor 25. In each code relay, its fourth armature is the address-sending armature and is connected in circuit C.31 over an individual wire 493 to a corresponding segment of the distributor 24, with back contacts of those armatures connected to positive battery 494 for transmitting spacing signals and with front contacts of those armatures connected to negative battery 495 for transmitting marking signals. All sixth armatures of the code relays 471 to 475 are connected in multiple to the battery 496 and all front contacts thereof are connected through the winding of relay 497 to the battery 496, forming circuit C.24.

Shaft 455 carries also a pinion wheel 500 with which is associated means for returning tape 406 after transmission of an address so that the address may be transmitted again. A tape-return solenoid 501 has an internal armature 508 to which is pivotally attached a rack 502 which cooperates with pinion wheel 500. A striker arm 503 is fixed upon the armature 508 of magnet 501 and operates to close a switch 504. Cooperating with rack 502 is a bellcrank armature 506 operated by a magnet 505 and a spring 507. Armature 506, rack 502, and pinion 500 are so related that the armature may depress the rack into engagement with the pinion or may effect their disengagement, the rack may be returned by solenoid 501 from any position to which it has been advanced, the wheel 500 may turn freely of the rack when the rack is lifted, and the rack and pinion engage each other, either to operate the other, when the rack is depressed by the armature. A short forward motion of the rack will engage it under a fixed detent 529 and a further movement causes it to engage and operate armature 509 of a magnet 510. The functions of the device will appear in the description of its operation. Solenoid 501 has its winding connected in series with battery 512 and contacts of a relay 513, circuit C.23, and also in series with battery 512, wire 658, winding of a magnet 514 in message indicator 382, Fig. 5, wire 657, bottom contacts of relay 515, and wire 656, circuit C.38.

Address transmitter 24 comprises a distributor having five code segments, a normal segment 516 and a brush arm 517. Normal segment 516 is connected in circuit C.22, through lower armature and back contact of test relay 485 to the right-hand terminal of resistance 520 and also is connected through the winding of magnet 518 and armature and front contact of test relay 485 to the left-hand terminal of resistance 520 and thence through contacts of relay 432 in message indicator 382, Fig. 5, and contacts of relay 481, Fig. 6, through back contact and left-hand armature of relay 522, and through winding of magnet 487 to battery 528 and ground 521. Relay 481 has its armature connected also through contacts of relay 522 to battery and ground. Circuit C.22 extends also from brush arm 517 through back contact and armature of magnet 510, upper winding of relay 513, contacts of slow relay 523 and top contacts of relay 515 to wire 524.

Message transmitter 25, Fig. 6, comprises a distributor containing five code segments, a normal segment 525 and an unconnected starting-signal segment 526, also a local switch 527, a brush arm 530 for engaging the commutator segments and for closing the local switch, and a start magnet 531. The brush arm 530 is carried by a shaft 532 which carries also a cam 533 which normally holds depressed five pivoted members 534, Fig. 6. In its rotation, cam 533 frees the five members 534 and permits them to rise under tension of their five springs 535 to lift feelers 453 against or through tape 406.

The magnet 531 is connected in circuit C.39, from one terminal through contacts of relay 523 to battery 536 and from the other terminal through wire 660, switch 504, wire 661, switch 407, Fig. 5, wire 662 and contacts of relay 515 to battery 536.

The local switch 527 is connected in circuit C.24 in series with battery 496 and the winding of relay 497 and the normal segment 525 is connected in circuit C.37, from battery 490, segment 525, arm 530, and lower winding of relay 515 to wire 66 which extends into Fig. 7. Test relay 515 has its upper winding connected to its top armature and back contact in circuit C.22 and has its lower winding in circuit C.37 connected to its second armature and front contact. The winding of the magnet 510 is connected to the battery 537 and to the front contact of the armature 509 in an alternative branch of circuit C.22, while lower winding of relay 513 is connected from battery through contacts of relay 481 to ground.

Apparatus is provided for receiving at an attendant's desk any message in which the repeated code address does not check identically and also messages with addresses not in code. A receiving instrument 540 is connected to a manual plug 541, and a manual jack 542 is adapted to connect to wire 66 the receiving instrument 540 forming an alternative branch of circuit C.37. When the plug has been inserted into the jack, a pair of contacts 543 adapted to be closed by insertion of the plug in the jack are connected in series with the winding of the relay 522, the left-hand winding of the stop magnet 483, and battery 544.

SELECTOR APPARATUS

Each selector 26 to 47 inclusive, Fig. 1, see selector 26, Fig. 7, comprises five notched code bars 551, 552, 553, 554, 555 and a plurality of detector bars or "letter" bars, A, B, Y, Z and others which overlie the code bars and drop into the notches of the five code bars when five notches are aligned under any letter bar. A locking bar 550 holds up all letter bars or releases all letter bars so that one of them may drop into aligned notches in the code bars. Each code bar may be operated by a polar magnet 556 to 560 inclusive and the locking bar 550 may be operated by a magnet 561. Each such selector has also a distributor comprising five code segments, 1 to 5 inclusive, with grounded segments between, a resistance segment 562 with resistance 563, holding segment 564 and a normal segment 565, also a local switch 566. A brush arm 570 engages the commutator segments in order and also engages and closes switch 566. The brush arm stops by engaging mechanically either the long end or the short end of an armature 571 of a starting magnet 572. The starting magnet 572 is marginal, will not operate it armature with a current of 30 m. a., will operate its armature with a current of 60 m. a., will hold its armature with a current of 10 m. a., and will hold its armature through a polar reversal with currents of 30 m. a. Electrical contacts 573 in the nature of relay contacts are provided for the letter bars, each letter bar closing four pairs of such contacts. One contact of each such pair is connected to a common wire 580, 581, 582, or 583, common to all letter bars, and the other contact of the pair is connected to a wire of a group individual to the letter bar, as 585, 586, 587, and 588. When a letter bar operates to close its contacts, the pair of contacts of the wire 587 closes before the remaining three pairs. An incoming signal wire 524 associated with trunk wire 66 is connected through the winding of starting magnet 572 to brush arm 570. The five code segments of the distributor are connected by five individual wires to the five code magnets 556 to 560 inclusive, and the intervening segments and normal segment 565 are connected to ground 590. Segment 562 is connected through resistance 563 to ground 590. Holding segment 564 is connected to a contact of the middle armature of relay 591. One contact plate of the local switch 566 is connected to ground 590, while the other plate is connected through the winding of magnet 561 to grounded battery, forming circuit C.32. When brush arm 570 stops in holding position, circuit C.32 is held closed, and wire 524 is held connected through the magnet 572 to holding segment 564 and thence to contacts of relay 591, resistance 594 and ground, forming an extension for circuit C.22.

The winding of a test relay 591 is connected from common wire 583 to ground through resistance 592 and through wire 583, letter-bar contacts as 573, wire 588, brush 608 in switch 600, wire 613, relay 614 and battery 634, forming circuit C.34. The top armature and front contact of relay 591 are connected to resistance 592 and to ground, the middle armature is connected through the winding of relay 593 to common wire 581, and through letter-bar contacts to brush 606 in switch 600, and the bottom armature and back contact are connected to ground and to common wire 582 and through contacts as 573 and winding of magnet 607 to battery, forming circuit C.33. The armature and front contact of relay 593 are connected to common wire 580 and to incoming trunk wire 66, to extend circuit C. 37.

Each group of letter-bar wires, as 585 to 588, extends to a rotary searching switch 600 of which there may be one for each letter bar. Each switch 600 comprises a set of rotary brushes, a field of fixed contacts for the brushes, and an electro-magnetically controlled power means for driving the brushes. A continuously driven power drum 601 is located near a brush drum 602 fixed on a brush shaft 603 which carries three brushes, a brush 605 connected to wire 585, a brush 606 connected to wire 586, and a brush 608 connected to wire 588. A clutch magnet 607 has an armature and crank arm 610 with an idler friction wheel 611. When magnet 607 attracts its armature 610 the wheel 611 is moved to engage both drums 601 and 602 thus driving brush shaft 603 and the three brushes.

The trunks among which the switch 600 searches comprise each three wires, a communication trunk wire, as 68 connecting switch 600 to selector 34, an accompanying signal wire as 612 corresponding in the second selector to wire 524 in the first selector, and a local busy test wire 613 connecting switch 600 to the test-control relay 614 the same as relay 350 of circuit C.3 in Fig. 5.

THE FINAL SELECTOR

A final selector 50, Fig. 10, is mechanically similar to selector 26 except that the letter bars close only three pairs of contacts, there is no searching switch, and the relay arrangement is different. A test relay 620 corresponds to the test relay 591, Fig. 7. Relay 621 corresponds to relay 593 but is connected in an individual signal wire of each letter bar rather than in a signal wire common to all letter bars. The test wire to be tested for selection is not equipped with a relay such as 614, Fig. 7, but extends to the relay equipment of the line as shown in Fig. 4.

Operation of Selectors

The operation of the selectors is started by deenergization of relay 432 in message indicator 382, Fig. 5, which occurs when the message-end signal of blank code is received by perforator 22. The armature and back contact of relay 432 close the switch starting circuit C.22, extending as described, from ground 521, Fig. 6, to wire 524 and now to magnet 572, Fig. 7, of first selector 26, brush arm 570, normal segment 565, to ground at 590. When this circuit is completed, magnet 487 is operated and the operation of its armature releases arm 486 and friction-driven shaft 440 starts. Cam 441 closes the contacts 444 to form circuits C.25 and C.26, as traced above.

During idleness, the holding circuit C.23 has held energized the solenoid 501, Fig. 6. Current in circuit C.22 now energizes and operates relay 513 to open the holding circuit and to deenergize the solenoid 501.

Also during the period of idleness the holding circuit C.24 is held closed by local switch 527 in distributor 25 thus holding relay 497 energized and holding its contacts open to maintain relay 523 unenergized. These conditions now continue.

Time 7—Blank-tape clearing

In the condition of idleness which preceded the seizing of trunk 17 by substation 10, tape 406 was blank, containing feed perforations but no code perforations, from perforator punches 374 to feelers 453. This distance is but a few inches but code perforations of the received message now are preceded in tape 406 by tape which is blank other than for feed perforations. Feelers 453 therefore have been released by cam 443 but have not risen through tape 406 because of the absence of any code perforations. The tape 406 therefore tests blank to feelers 453 and circuit C.26 as traced above may be formed, which energizes relay 476 and opens circuit C.25.

Cam 442 closes contacts 445 and forms the transmission cut-out circuit C.27, energizing magnet 483 to permit arm 486 to pass without energizing magnet 518 for transmission. Cam 442 also closes contacts 446 to form circuit C.28 to energize lamp 480 but current in circuit C.27 energizes relay 477 to open circuit C.28 so that lamp 480 does not glow.

Circuit C.22 holds magnet 487 energized and circuits C.26 and C.27 are completed at each rotation of shaft 440, until all blanks in the tape as well as "letters" or "unshift" codes have been fed past feelers 453 and code holes are encountered by those feelers.

Time 8—Operation of the first selector

The first letter of the address of the message reaches principal feelers 453 and the same letter repeated reaches auxiliary feelers 454. Circuit C.22 remains closed and magnet 487 remains operated to pass arm 486 without a pause.

Tape 406 is perforated as shown in Fig. 2. The two sets of feelers 453 and 454 respectively are separated by a distance equal to six steps of tape 406 so that when first letter B of the address of the message is in position to be read by feelers 453, second letter B of the address of the message is in position to be read by feelers 454 as a check upon the accuracy of the address codes.

Shaft 440 rotates and approaches the armature of magnet 483. Cam 443 permits a set of five feelers 453 and a set of auxiliary feelers 454 to rise to test the tape for code combinations of perforations. The first, fourth, and fifth feelers 453 and the first, fourth, and fifth feelers 454 pass through tape 406 and close their associated lower contacts. Relays 471, 474, and 475 are energized over their three circuits C.29 in accordance with the code for letter B.

Cam 441 closes contacts 444 to form circuit C.25 and magnet 505 is energized. Circuit C.26 is not formed because at least one code relay is energized. Cam 442 closes contacts 445 to form circuit C.30, traced above. Relays 485 and 477 and magnet 483 are energized. Relay 477 opens the lamp circuit. Test relay 485 substitutes magnet 518 for the resistance 520 in circuit C.22, thus reducing the total resistance of this circuit and increasing the current in the circuit to 60 m. a., operating the magnets 518 and 572. Magnet 483 attracts its armature and clears the path for arm 486.

The speed of brush arm 517 is double that of arm 486. Therefore, while shaft 440 rotates from its 45° position to its 190° position the brush arm 517 will reach position 290° on segment 516. The distributor arms 517 and 570 however move in unison and are released upon the energization of their start magnets.

When brush arm 517 leaves normal segment 516, circuit C.22 is interrupted and magnet 487 is deenergized. Address signal transmission circuit C.31 as traced above then is effective five times, for each marking signal through negative battery 495, and for each spacing signal, through positive battery 494. The magnets 556 to 560 are thus energized in polar manner and in a code combination.

The code for B now has been set on first selector 26. When brush arms 517 and 570 reach the position of 290°, the arm 486 is at 190°. Contacts 445 are opened, thereby interrupting circuit C.30 and deenergizing relay 485. Arms 517 and 570 interrupt circuit C.31 by leaving their No. 5 segments and form circuit C.22 by engaging their segments 516 and 562 respectively.

At this time circuit C.22 extends from ground 521, through battery 528, Fig. 6, through unenergized magnet 487 and resistance 520, segment 516, brush arm 517 in motion, upper winding of relay 513, wire 524, energized magnet 572, Fig. 7, brush arm 570 in motion, segment 562, resistance 563, to ground at 590, with a currnet of 10 m. a. flowing therethrough. Brush arm 570 in selector 26 engages mechanically the long end of the armature of magnet 572 and stops at its 315° position, thus switching circuit C.22 from segment 562 to holding segment 564 whence this circuit extends through contacts of the middle armature of relay 591 and resistance 594 to ground. The current remains 10 m. a. because of the resistance 594, substituted for resistance 563, but brush arm 517 stops at its normal position without changing the circuit. Magnet 487 now has 10 m. a. which is not sufficient to operate its armature and relay 513 has 10 m. a. and holds its armature as does magnet 572.

At the time of engaging segment 562, brush arm 570 also closed local switch 566 and therefore closed circuit C.32, causing the energization of magnet 561. Locking bar 550 is consequently operated and mechanically unlocks all bars of the set of letter bars having code relation with the code bars 551 to 555. The code relation is such that when the predetermined code, as B, is set upon the code bars 551 to 555, the letter bar B will be unrestrained by any bar 551 to 555 and all other letter bars will be restrained from movement to close their electrical contacts. As now described, code bars 551 to 555 are set for code B and locking bar 550 is operated to unlock them. Bar B is not restrained in any way and therefore moves and closes its electrical contacts. By this selection and operation of letter bar B, the four common wires 580, 581, 582, 583 of the selector 26 have been connected to searching switch 600 by connecting them to the individual wires 585, 586, 587, 588, which starts to rotate when the first contact is completed to establish circuit C.33.

Searching switch 600 now is rotating and letter bar B closes all contacts, closing the testing circuit C.34. The action in the circuit C.34 is identical with the action in the testing circuit C.3. Busy trunks give to the brush 608 a current insufficient to operate the test relay 591, while an idle trunk gives current sufficient to operate relays 591 and 614. Should two relays as 591 test the same trunk wire as 613 at the same time, the relay 614 would operate and the searching relays would not operate. Both searching relays would reject the trunk as busy and both searching switches would continue to rotate. When an idle trunk has been found, relay 591 operates its top armature to shunt the resistance 592 and relay 614 is energized to render the wire 613 busy-by-test. Relay 591 operates its bottom armature to open the drive circuit C.33 and the finder switch 600 stops in engagement with the tested and seized trunk 68. Relay 591 also operates its middle armature to switch circuit C.22 from the resistance 594 and to extend this circuit from the holding segment 564 through the middle armature and front contact of relay 591, through winding of relay 593, contacts of letter bar B, brush 606 and contact in switch 600, wire 612 to selector 34, magnet, distributor arm and normal segment to ground 635.

When the circuit just traced is established, relay 593 operates and connects wire 66 to wire 580 and thence to wire 585 thus effecting the first step in building up the message transmission circuit C.37 to be described.

The current now flowing in circuit C.22 and its first extension to the second selector, increased by removing the resistance 594, is approximately 30 m. a. which energizes switch starting magnet 487 to operate its armature for the second letter of the address, to be registered upon the second selector 34.

At the instant when relays 591 and 614 operate, arm 486 is approaching the armature of magnet 487 if the search of switch 600 has been short, as is in mechanical engagement with the armature of magnet 487 if the search of switch 600 has been long. During the period of the last 170° of shaft 440, feelers 453 and 454 have been withdrawn from tape 406, then shaft 455 has been turned to advance tape 406 and rack 502 one step. Return of feelers 153 has opened switches 462 to deenergize all relays 471 to 475 thus forming circuit C.26 to energize relay 476 which opens circuit C.25 and deenergizes magnet 505, but the slow-to-release armature of magnet 505 holds rack 502 in engagement with wheel 500 long enough to permit wheel 500 to step the rack and to engage the end of the rack under the stud 529. This action has advanced tape 406 to present the next two sets of code perforations to the two sets of feelers 453 and 454.

*Time 8-B—Defective address*

A message having a defective address, or in which the code address has not been repeated, will be sent to an attendant's desk and the attendant then will correct or complete the address and will forward it by the automatic selecting and transmitting devices.

Should any letter of the address not correspond to its companion letter, test circuit C.30 will not be formed between code switches 466 to 470 and corresponding code relays 471 to 475. Stop magnet 483 is not charged by circuit C.30 and arm 486 stops at 60° in mechanical engagement with the armature of magnet 483. Cam contacts 446 close lamp circuit C.28, relay 477 is not energized by circuit C.30 and lamp 480 glows to signal the attendant. Relay 481, energized by current in circuit C.28, opens circuit C.22, deenergizing magnet 572 in all selectors, thus restoring all selectors, and deenergizing relay 513, thus energizing solenoid 501 to return tape 406 to its starting position.

The attendant noting the signal, inserts plug 541 into jack 542. Jack contacts 543 close a circuit including battery 544, left-hand winding of magnet 483 and the winding of relay 522, which causes magnet 483 to attract its armature and permit arm 486 to start from its 60° position. The left-hand armature and back contact of relay 522 open the winding of magnet 487 and arm 486 will stop at normal and cam 442 will open lamp circuit C.28. Circuit C.22 now is formed from ground and battery through contacts of relay 522 instead of through magnet 487, and extends to wire 524 and to ground 590 in selector 26 with a current of 30 m. a. which will not operate magnet 572 in the selector.

Switch 546 is normally open. After inserting the plug 541 and when the lamp 480 has been extinguished, the attendant closes the switch 546, thus forming a branch of circuit C.37 from wire 66 to ground. This circuit extends from battery 490, over common wire 491, normal segment 525 of distributor 25, brush arm 530, front contact and second armature of relay 515, spring of jack 542, plug 541, receiver 540 through key 546 to ground, and energizes relay 515 which locks as described elsewhere and closes circuit C.38 described later herein. The striker 503 closes the contacts 504 and thus closes the control circuit C.39 described later herein, thereby energizing the starting magnet 531 of the distributor 25 and the distributor 25 transmits the entire message to the receiver 540.

Should the addressee have no code address, the operator at the originating substation will transmit the address in full and in plain language. The first letter of the address will cause the action described above and the entire message will be recorded at receiver 540. The attendant then will supply at the beginning of the message a code address of an office near the address of the message and the message will be sent automatically to the code address, whence it may be delivered by messenger to the addressee.

OPERATION OF THE SECOND SELECTOR

*Time 9.*—The switching starting circuit C.22 now extends from ground 521, Fig. 6, to ground 635 in second selector 34. The current is 30 m. a. produced through resistance 520 and magnet 487 is energized. Arm 486 passes normal position to begin its second cycle and the operations of the first address letter are repeated for the second address letter and for second selector 34. Feelers 453 and 454 rise through the tape 406 in code manner. Two code relays in circuits C.29 are closed for the fourth and fifth signals of the code, energizing relays 474 and 475 as required for the letter O.

Circuit C.30 is established to energize magnet 483 and to energize relay 485 to include magnet 518 in circuit C.22 and to increase the current in circuit C.22 to 60 m. a. to operate magnet 518 in transmitter 24 and magnet 572 in selector 34. Signal circuit C.31 is formed five times and adjusts the five code bars of second selector 34 to code positions for letter O. Circuit C.32 is then completed to unlock the letter bars of second selector 34 and letter bar O of that selector operates to close its contacts. A searching switch 600 in selector 34 finds and seizes a trunk 70 in the BO group of trunks. All other circuits of time 8 are repeated and arm 570 of selector 34 stops in mechanical engagement with the long end of the armature of magnet 572 of that selector and extends circuit C.22 to third selector 40, Fig. 8, with current of 30 m. a. to energize magnet 487 for the third address letter.

OPERATION OF THE THIRD SELECTOR

*Time 10.*—Switching starting circuit C.22 now extends from ground 521 to ground 636 in third selector 40 in which the current is approximately 30 m. a., and over which magnet 487, Fig. 6, is energized. Arm 486 passes its normal position to begin its third cycle and the operations of the first address letter are repeated for the third address letter T and for third selector 40. All other circuits of time 8 are repeated and brush arm 570 of selector 40 stops in mechanical engagement with the long end of the armature of magnet 572 of that selector and extends circuit C.22 to ground 637 in fourth selector 44 with current of 30 m. a. to energize magnet 487, Fig. 6, for the fourth address letter.

OPERATION OF THE FOURTH SELECTOR

Figure 8:
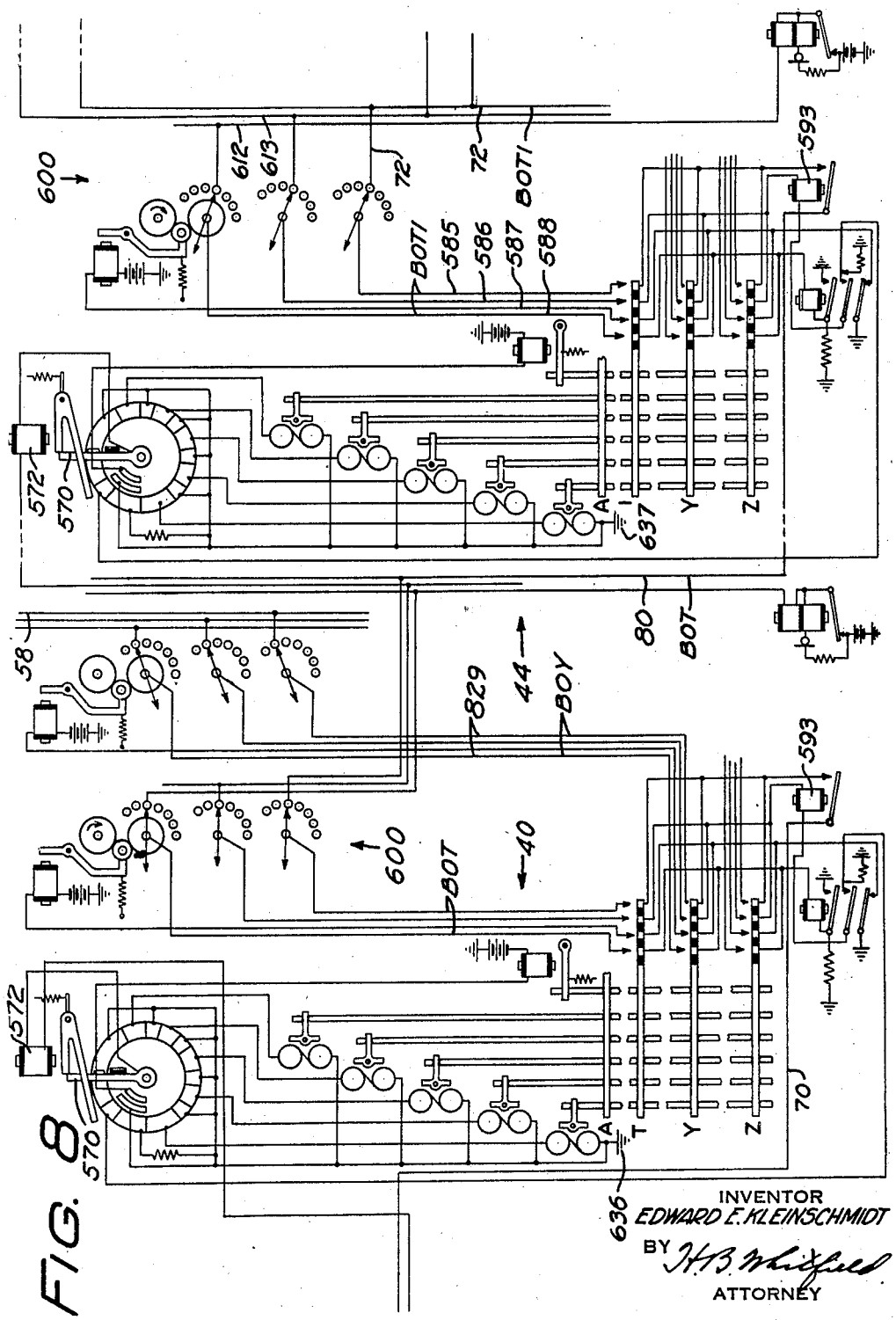
Fig. 8 shows circuits of third and fourth selectors and indicates circuits for trunking to offices in the same district.

*Time 11.*—Circuit C.22 now extends from ground 521, Fig. 6, to ground 637 in fourth selector 44, Fig. 8, with current approximately 30 m. a. and magnet 487, Fig. 6, is energized. Arm 486 passes normal position to begin its fourth cycle and the operations of the first address letter are repeated for the fourth address letter I and for fourth selector 44. All other circuits of time 8 are repeated and brush arm 570 of selector 44 stops in mechanical engagement with the long end of the armature of magnet 572 of that selector, extending circuit C.22 to ground 640, in final selector 50 with current of 30 m. a. to energize magnet 487, Fig. 6, for the fifth address letter.

OPERATION OF THE FINAL SELECTOR

*Time 12.*—Circuit C.22 now extends from ground 521, Fig. 6, to ground 640 in final selector 50, Fig. 10, with current approximately 30 m. a. and the magnet 487 is energized. Arm 486 passes normal position to begin its fifth cycle of operation and the operations of the first letter of the address are repeated for the fifth letter F of the address and for fifth or final selector 50.

The feelers 453 and 454 rise through the tape 406 in code manner and three circuits C.29 are formed for the first, third, and fourth signals of the code, energizing relays 471, 473, and 474 as required for letter F. Circuit C.30 is formed to energize magnet 483 and relay 485, to include magnet 518 in circuit C.22, to increase the current in circuit C.22 to 60 m. a., to operate magnet 518 in transmitter 24 and magnet 572 of final selector 50. Signal circuit C.31 adjusts the five code bars of the final selector 50 to the code positions for letter F.

Circuit C.32 local to final selector 50 is formed to unlock the letter bars of selector 50 and letter bar F of that selector operates to close its contacts. Arm 570 of selector 50 stops in engagement with the long end of the armature of magnet 572 of that selector to extend circuit C.22 through the contacts of relay 620 and resistance 641 to ground with a current of 10 m. a.

The contacts of operated letter bar F connect three common wires 643, 644, 72 to individual line wires 645, 646, and 647 respectively. Test circuit C.35 is formed to determine the busy-by-test condition of the selected telegraph line whose directory number for urgent messages is BOTIF. If the line be idle, the relays 333, 621, and 620 are energized to operate.

Circuit C.35 extends from battery 345, resistance 344, wire 343, bottom armatures and back contacts of relays 332 and 366, both unenergized if the selected line be idle, wire 346, back contact and first armature of unenergized relay 334, upper winding of relay 333, test wire 650, Fig. 10, upper winding of relay 621, wire 645, closed contacts of operated letter bar F, common wire 643, upper winding of test relay 620 to ground. Relay 333 operates over this circuit and by its upper armature it switches circuit C.22 to include windings of relays 333, 334, 335, and 366, while by its bottom armature it removes ground from the winding of relay 332. Relays 333, 620, and 621 jointly form an extension for circuit C.22 which now is no longer an operating circuit but acts as a holding circuit and includes holding windings for those relays.

The extension of circuit C.22 may be traced from segment 564 in final selector 50, armature and front contact and lower winding of energized test relay 620, wire 642, contact of letter bar F, common wire 646, lower winding then upper armature and front contact of cut-through relay 621, holding wire 652 of line 15, Fig. 4, armature, front contact and lower winding of energized holding relay 333, winding of cut-off relay 334, back contact and upper armature of shunting relay 335, upper winding of relay 366, to ground 653. Relay 366 operates and disconnects battery 337 from line wire 15 of the selected substation. Also over this circuit relay 334 is energized. By its first armature it opens circuit C.35 and renders the test wire 645 busy-by-test, by its second armature, jointly with the middle armature of relay 621, wire 647 is extended to the line wire 15, to form ultimately the communication circuit C.37, and by its third armature it closes ringing circuit C.36 to operate the calling relay 311, as traced above.

Relay 311 operates and battery current flows through circuit C.37, to be described, to energize relay 313. The selection and seizure of the desired substation has now been accomplished.

*Time 13—Setting up communication*

Shaft 440 enters its final 170° and cam 441 opens contacts 444, while cam 442 opens contacts 446 and 445, which interrupt circuit C.30 and deenergize relay 485 and magnet 483. Brush arm 517, Fig. 6, stops at normal while brush arm 570, Fig. 10, stops at 315°. Holding circuit C.22 now extends from ground 521, Fig. 6, through Figs. 7, 8, and 9 to ground 653 in Fig. 4. The feelers are withdrawn from tape 406, and tape 406 and rack 502 are advanced for the fifth step.

At its fifth step, rack 502 operates mechanically the armature of magnet 510 to open the back contact and close the front contact. By this action, circuit C.22 is switched from battery 528 and ground 521 to reversed battery 537 and ground 654. Magnet 487 is deenergized in time to stop the arm 486. Circuit C.22 now extends from ground 654, through winding of magnet 510, front contact and armature 509, upper winding of relay 513 to wire 524 and thence to ground 653, Fig. 4. Relay 513 remains energized and operated. The five magnets 572 in the selectors 26, 34, 40, 44, and 50 retain their armatures and retain their brush arms in holding position. The four relays 593 in selectors 26, 34, 40, and 44 remain energized and operated. Relays 620 and 621 in final selector 50, Fig. 10, and relays 333, 334, and 366 of the selected line, Fig. 4, are held energized.

Communication circuit C.37 has been formed in a preparatory condition from battery 490, Fig. 6, wire 491, directly to the normal segment 525 of transmitter 25, or through third armatures of relays 471 to 475 inclusive in code combinations to other segments in transmitter 25, thence from brush arm 530 through lower winding of relay 515 and wire 66 to first selector 26, Fig. 7, contacts of relay 593 in selector 26, contacts of operated letter bar B in selector 26, brush and contact in switch 600 of selector 26, trunk wire 68 of the B group of trunks to second selector 34, contacts of relay 593 in selector 34, contacts of operated letter bar O in selector 34, brush and contact in switch 600 of selector 34, trunk wire 70 in the BO group to third selector 40, Fig. 8, contacts of relay 593 in selector 40, contacts of operated letter bar T in selector 40, brush and contact in switch 600 of selector 40, trunk wire 80 in the BOT group of trunks to fourth selector 44, contacts of relay 593 in selector 44, contacts of operated letter bar I in selector 44, brush and contact in switch 600 of selector 44, trunk wire 72 in the BOTI group of trunks to fifth or final selector 50, Fig. 10, contacts of operated letter bar F in final selector 50, contacts of individual relay 621 "F" of final selector 50, wire 647, Fig. 4, front contact and second armature of relay 334, lower winding of relay 335, choke coil 336, line wire 15, Fig. 4, or 19, Fig. 1, to substation 10, BOTIF, printer magnet 13, keyboard contacts 14, resistance 306, winding and shunt of relay 313, upper armature and contact of relay 311 energized by circuit 36, fourth and third contacts of key 301 to ground at 316.

A direct current of 10 m. a. now flows in circuit C.37, the current being limited by the resistance 306, Fig. 4. Relay 515, Fig. 6, does not energize upon a current of 10 m. a. but relay 335 at the central office, Fig. 4, and relay 313 at the substation, Fig. 4, energize and operate their armatures. By its upper armature, relay 335 interrupts the shunt from its upper winding and includes its upper winding in the holding circuit C.22. By its lower armature, relay 335 interrupts the ringing circuit C.36 and shunts its lower winding and also the choke coil 336 from the communication circuit C.37. Relay 313 operates its armatures and by its upper armature shunts the contacts of relay 311 to provide a connection to the ground 316 after the deenergization of relay 311 which will result from opening the ringing circuit C.36 by the operation of shunting relay 335 just described. Relay 313 is held by current in the communication circuit C.37. The lower armature and contact of relay 311 have closed momentarily the local signal circuit C.8 through contacts of relay 311 instead of through armature 302 and contact 304. Relay 314 operates to close circuit C.9 which may be interrupted manually by key 321, all as previously described. The lower armature and front contact of relay 313 connect motor 300 to power mains 310. The motor starts and when it attains its maximum speed it closes contacts 305, shunting resistance 306 and reducing the resistance of communication circuit C.37, which causes the current in the communication circuit to rise to 60 m. a. and operate printer magnet 13 at station 10, BOTIF, Fig. 4, and relay 515, Fig. 6.

The relay 515 operates its upper armature and back contact to open the shunt which has been existing upon its upper winding, thus introducing that winding into the holding circuit C.22, and operates its second armature and front contact to form a shunt upon its lower winding thus removing that winding from the communication circuit C.37. The third armature and front contact of relay 515 prepare circuit C.39 to be closed by contacts 504 now open, and the bottom armature and front contact of relay 515 close circuit C.38 to energize solenoid 501.

Solenoid 501 draws its armature into normal position, withdrawing rack 502 and turning pinion wheel 500, rotating shaft 455 and sprocket wheel 456 and returning tape 406 to its starting position with the first code of the first set of address codes in position to be tested by the principal feelers 453. At the end of the movement of armature 508, rack 502 is released from stud 529, and spring 507 operates the bellcrank to lift rack 502 out of engagement with pinion 500. Arm 503 closes contacts 504 and forms the communication control circuit C.39.

MESSAGE TRANSMISSION

Time 14.—Magnet 531 remains continuously energized by current over circuit C.39. Brush arm 530, shaft 532 and cam 533 rotate continuously, operating the principal feelers 453 repeatedly while the auxiliary feelers 454 remain inert.

At any time during selection or transmission by the transmitters of Fig. 6, except when the perforator is operating to record blanks, test wire 322, Fig. 5, of primary trunk 17, is idle-by-test and may be seized by any calling substation. The perforator 22 then may receive another message and ample tape will be supplied by the other message to keep tape 406 slack during the entire period of communication of the preceding message.

Following transmission of the complete message, the arbitrary message-end signal comprising one "blank" selection is received. During communication, circuit C.24 has been closed either by brush arm 530 when at rest and during the first quarter of its rotation or by the sixth armature and front contact of an energized relay 471 to 475.

DISCONNECTION

Time 15.—The message-end signal of one "blank" selection in the tape 406 reaches the feelers 453. No feeler enters the tape, no relay 471 to 475 is energized, no sixth armature engages its front contact, the brush arm 530 rotates to break circuit C.24 and relay 497 is deenergized, which energizes relay 523 and lower armature and back contact of relay 523 open circuit C.39 and deenergize magnet 531 to stop arm 530. Brush arm 530 immediately recloses the switch 527 and restores circuit C.24, but relay 523 retains its armatures in operated position for two seconds. The upper armature and back contact of relay 523 open the holding circuit C.22 and deenergize magnet 510 and relays 513 and 515 in Fig. 6, also magnets 572 and relay 593 in each and every of the four selectors 26, 34, 40, and 44 in Figs. 7 and 8, magnet 572 and relays 620, 621 in final selector 50, Fig. 10, and relays 333, 334, 335, and 366 of the called line, Fig. 4. The slow-to-release relay 366 will retain its armature until after the relay 313 has released its armatures and then will connect the line 13 through to the relays 331 and 330 and to the battery 337.

In each and every one of the five selectors 26, 34, 40, 44, and 50, the deenergization of the magnet 572 causes the long end of the armature 571 to release the brush arm 570. The brush arm then moves to normal position in engagement with the short end of the armature 571 thus abandoning the segment 564 and opening the local switch 566 to open the unlocking circuit C.32 containing the winding of magnet 561, which permits locking bar 550 to return to normal and to lift the operated letter bar of each and every selector thus opening the electrical contacts of all letter bars.

Opening the letter bar contacts in selectors 26, 34, 40, and 44 interrupts the busy test circuit C.34 in each selector and deenergizes relays 591 in the selectors 26, 34, 40, 44 and relays 614 associated with trunks 62, 70, 80, 72, and opening the tape return circuit C.38 has deenergized the magnet 514, Fig. 5. The release of its armature has caused a step of one of the ratchets in the message indicator 382 and if no subsequent message has been received by perforator 22, it has closed the contacts 435 to form the circuit C.21 to reenergize the relay 432, which opens circuit C.22.

Deenergization of the substation relay 313, Fig. 4, has opened its upper armature and front contact to remove the substation ground from the line wire 15 and has opened its lower armature and front contact to open the circuit of the motor 300. The motor stops and opens the contacts 305. The message has been printed at the receiver and the signal device 317 has called the attendant at the station to give attention to the transmitted message.

All parts which have been used in the assumed first message described above now have been released and restored to their positions of rest and the perforator 22 is again active in perforating a second message as assumed.

TAPE BLANKING

Assume that no subsequent message has been received upon perforator 22 and that the message-end signal of one blank code remains but one tape-step from perforator punches 374. The perforator feeding mechanism restrains tape 406 at punches 374, Fig. 5, and feed sprocket 456, Fig. 6, produces a taut tape at the tape follower 380, Fig. 5, while there yet remains code-perforated tape to be transmitted. Blank tape now is produced automatically. The tape follower switch 380 closes contacts 409 which form circuit C.40 previously described, to operate relay 403, which, by its middle armature, connects ground over circuit C.41 through resistance 414 to test wire 322 to operate relay 350 and to make the trunk 17 test busy, by its top armature closes the interrupting circuit C.42 previously described, which vibrates the armature of magnet 413 and closes intermittently the contacts 415, and by its bottom armature closes circuit C.43 for energizing the perforator power magnet 375 repeatedly as the contacts 415 operate in a vibrating manner. Magnet 375 responds and perforates tape 406 repeatedly but with the use of the fixed punch only, since no magnet 371, 372 is energized to effect any code combination, resulting in a quantity of blank tape sufficient to relieve the tension of the tape at the tape follower 380 with the consequent opening of the switch 409 and the deenergization of the relay 403. The tape again may become taut and the operation of relay 403 to produce blank tape may be repeated until the feelers 453 encounter the code perforations for the message-end signal, when the operations of time 15 follow.

TRANSMISSION DELAY

When a message is being transmitted and before the tape 406 has become taut, the trunk 17 may be seized and the seizing substation may send the address to seize the perforator 22 and operate the relay 410. Should the operator at the substation be slow in keyboard work or should a pause occur, then the tape 406 may become taut at tape follower 380 at a time when relay 410 is energized and when circuit C.40 cannot be formed because it is open at the middle armature of energized relay 410. Transmitter 25 continues to operate and to rotate the bellcrank of tape follower 380 further until tape follower switch 407 is opened, thus interrupting circuit C.39 and releasing control magnet 531, Fig. 6, which stops the transmitting brush arm 530. As the substation of the subsequent message transmits groups of codes, the tape 406 is relaxed, the contacts 407 close the circuit C.39 and the transmitter 25 uses tape until the tape is again taut to open the contacts 407 or until the message-end signal of "blank" code is encountered by the feelers 453, when the operations of time 15 will follow.

BUSY SUBSTATION LINE

The test circuit C.35 of a tested busy line is open at the lower armatures and back contacts of relays 332 and 366 if transmitting, or at the top armature and back contact of relay 344 and at the contacts of relay 366 if receiving. Relay 620 of the testing final selector does not energize and the testing final selector awaits the release of the selected line which is continuously under test during this period of waiting. Upon the release of the selected line and upon the release of the armatures of the slow-to-release relay 366, the waiting final selector seizes the line and the operations previously described follow.

Should two testing final selectors be waiting when the selected line is released, the resistance 344, Fig. 4, will restrict the current so that the waiting relays 621, Fig. 10, will not operate but the waiting relays 620 will operate, extending the circuit C.22 of each selector to the open contact of the unoperated relay 621, thus opening the holding circuit C.22 and releasing all selectors and relays including the two relays 513, Fig. 6, which energize the tape-return solenoids 591 to return the tape 406 and the selection and test will be repeated.

ANSWERBACK APPARATUS

Each final selector 50, 51, 52, 53 of the BOTI group of Fig. 1 has an answerback device 54, Fig. 1, associated with perforator 74, transmitters 73, 75 and first selector 76. The device 54 is indicated in Fig. 1 and its circuits are shown in detail in Fig. 9.

A local signal relay 622, Fig. 9, has its winding connected to the signal wire 613 of the fourth selector 44, Fig. 8, and to the magnet 572 in the final selector 50, Fig. 10, thus including its winding in the holding circuit C.22, while a repeating relay 623 has its winding connected to the trunk wire 72 in Fig. 8 and to the trunk wire 72 in Fig. 10, thus including its winding in the communication circuit C.37.

A signature distributor 670 comprises a friction driven brush arm 671, a starting magnet 672, armature 673, and a plurality of segments to be engaged by the three brushes 674, 675, 676, carried by the brush arm 671. The armature 673 has a long end 677 for engaging the brush arm 671 mechanically to stop it in the normal position as shown when magnet 672 is deenergized, and a short end 678 for engaging the brush arm to stop it after a short rotation clockwise when the magnet 672 is energized. The winding of the magnet 672 is connected in circuit C.44, to ground and to the front contact of the upper armature of relay 622, thence to battery 680. Segments 681 are adapted to be closed by brush 675 when the brush arm 671 is in its second stop position and at all times other than when the brush 671 is normal. Segments 682 are adapted to be closed by brush 676 while the brush arm 671 is leaving its second stop and approaching its normal stop, but not to be closed when the brush arm is in either stop position or when passing from normal to its second stop position. The two segments 682 are connected to the two terminals of the winding of relay 622 to shunt the relay winding. The series of small segments 683 also are adapted to be engaged by brush 675.

The outer ring of segments is traversed by brush 674. Some of the segments are blank and some are connected to battery 680 through the lower armature and back contact of relay 622, the connection being made in code combinations to provide a desired series of signal codes when engaged serially by the brush 674. The normal segment 684 is a blank segment and is engaged by brush 674 in both of its stop positions. The segment 685 is connected to battery and constitutes a stop-signal segment which is engaged by the brush 674 as soon as it is released from its second stop position. Following the segment 685 are six groups of segments, 690 to 695 inclusive, of seven equal small segments in each group and connected to battery in code manner. Since the distributor of Fig. 9 is assumed to be associated with the telegraph line whose directory indication is BOTIF, its segments must be connected accordingly, the first group 690 being connected for word-space code, thus, start, space, space, mark, space, space, stop, the second group 691 being connected for the letter B, start, mark, space, space, mark, mark, stop, as shown in Fig. 9, the third group 692 being connected for the letter O, start, space, space, space, mark, mark, stop, the fourth group 693 being connected for the letter T, start, space, space, space, space, mark, stop, the fifth group 694 being connected for the letter I, start, space, mark, mark, space, space, stop, and the sixth group 695 being connected through contacts of the letter relay 624 for the letter F, start, mark, space, mark, mark, space, stop. Each distributor 670 has 26 letter relays 624, the 26 windings being associated each with one of the 26 letter bars of final selector 50 and the contacts of each letter relay 624 being connected in code manner to represent the code of the letter with which the letter relay is identified in the final selector. Letter relays 624 are connected in circuit C.50, from battery 730, contacts of relays 727 and 726 when closed, wire 729, segments 681 and brush 675, wire 734 common to all letter relays, winding of one letter relay 624, wire 738, contacts of relay 621, Fig. 10, to ground, with a branch of circuit C.50 extending from wire 729 through winding of relay 706 to ground, so that both relays 624 and 706 are energized, and a holding circuit C.52 is provided from battery 730, front contact and second armature of relay 706, inner segment 681, wire 734, winding and top armature and contact of relay 624 to ground, with a branch circuit C.51 through brush 675, outer segment 681, wire 729 and branch wire through winding of relay 706 to ground. A branch circuit C.53 extends from circuit C.52 through winding of relay 416 of message indicator 732 to ground so that the message indicator relay is held while relay 706 is energized.

A transmitting distributor 700 has a brush arm 701 and a starting magnet 702 with armature 703 for engaging and stopping brush arm 701. The armature 703 has a long end for stopping the brush arm off-normal when magnet 702 is deenergized and a short end for stopping the brush arm at normal when magnet 702 is energized. The commutator of distributor 700 comprises the customary five code segments, blank segment, normal segment 704, and a local switch 705. Normal segment 704 and brush arm 701 are connected in circuit C.45 through the winding of the starting magnet 702 to ground, and through the contacts of relay 623 and front contact and lower armature of relay 622 to battery 680. The five code segments are connected over five wires 736 to the five armatures third to seventh of the relay 706, whence through front contacts and wires 737 they are extended over circuits C.54 through perforator code magnets 712 to ground, and whence also they are extended alternatively through back contacts over circuit C.46 through detector magnets 721 to 725 to ground. Switch 705 is connected in the perforator power magnet circuit C.56, from ground through winding of power magnet 707, switch 705, contacts of relay 710, wire 740, second armature of relay 706 to battery 730. Circuit C.56 also has branch path over wire 711 to the segments 683 in the distributor 670, brush 675, inner segment 681, wire 731, second armature of relay 706, and to battery 730.

The perforator 74, Fig. 9, is mechanically similar to the corresponding device of Fig. 5. Each magnet is provided with a holding contact to its armature, and holding circuit C.55 extends from ground through winding, contact, and armature of any magnet 712, wire 713 through winding of relay 710 and through holding contacts 714 to battery 715. The contacts 714 are operated by cam 716 fixed on start-stop shaft 717 which carries brush arm 701. Tape 720 is similar to tape 406 and passes from perforator 74 to a transmitter according to Fig. 6.

The bottom armatures of five code-detector relays 721 to 725 are connected from windings of the respective relays to the holding circuit C.47 extending to the cam contacts 714 and to battery 715, and the top and middle armatures are connected in code manner from the windings of the code detector relays 726 in circuit C.48 and 727 in circuit C.49 to ground.

The message indicator 732 is identical with the message indicator 382, Fig. 5. The magnets 416, 514, relay 432, and contacts 435 correspond to the similarly labeled items in Fig. 5 and the wires 658, 657, 630, and 631 correspond to similar wires in a transmitter identical with Fig. 6.

OPERATION OF THE ANSWERBACK

When the double address and the body of the message have been transmitted, the codes for "shift" and "H" are transmitted followed by "unshift" and the signature of the originating station which is double as was described for the address. When the circuit C.22 was extended to the final selector, Fig. 10, relay 622, Fig. 9, was energized and its upper armature closed circuit C.44 described above. Magnet 672 attracts its armature 673 and brush arm 671 rotates to its second stop position. Its brush 675 connects the two segments 681. When the communication circuit C.37 is completed with a current of 60 m. a., relay 623 is energized and thereafter that relay responds to all signals in circuit C.37. The lower armature and front contact of relay 622 enables the contact and armature of relay 623 to form the starting circuit C.45 and then the signal circuit C.46. Each operated relay 721, 725 in the detector set forms its holding circuit C.47. Just before brush arm 701 reaches the long stop end of armature 703, cam 716 opens contact 714, thus interrupting the holding circuit C.47 and deenergizing relays 721, 725.

Should the code "figure shift" be transmitted over circuit C.37 and be received by relay 623, the relays 721, 722, 724, and 725 will be energized and so held, forming circuit C.48 described above, to operate relay 726. Should the code "H" be transmitted over circuit C.37 and received by relay 623 the relays 723, 725 will be energized and so held forming circuit C.49 to operate relay 727. After the transmission of the body of the message and before the transmission of the signature, codes "figures shift" and "H" will be transmitted. The code "shift" will form circuit C.48 and the code "H" immediately thereafter will form circuit C.49 before the release of the armature of slow relay 726 thus forming circuit C.50 and operating relays 706 and 624 which then form their holding circuits C.51 and C.52, also circuit C.53 for operating magnet 416 of message indicator 732.

Relay 706 by its third to seventh armatures interrupts the five circuits C.46 and forms five circuits C.54 to code magnets 712 of perforator 74. Each operated code magnet 712 closes its holding circuit C.55. Relay 706 also prepares perforator power magnet circuit C.56. After distributor switch 705 has operated perforator power magnet 707 over circuit C.56, cam 716 operates switch 714 to interrupt circuit C.55, and deenergizes magnets 712 and relay 710.

The repeated signature BOTIK BOTIK is received and perforated in the tape 720 and then the message-end signal of one "blank" code is received. To prevent the perforation of this blank code in the tape 720, the relay 710 is provided. For this code the brush arm 701 rotates but none of the magnets 712 is energized nor is the relay 710 energized and switch 705 does not form circuit C.56 because the contacts of relay 710 are open.

Upon the release of the selected line, relays 622 and 623 will be deenergized, and relay 622 by its front contacts will interrupt circuits C.44 and C.45, thus deenergizing magnets 672 and 702 and starting brush arms 671 and 701. Brush 676 engages segments 682 and shunts the winding of relay 622 to prevent energization while that relay by its back contact prepares a branch path for circuits C.45 and C.54 to be closed by brush 674, the two circuits being now open at the contacts of deenergized relay 623 and being formed instead from battery 680 through back contact of deenergized relay 622, wire 742, segments and brush 674 of distributor 670 and wire 743. Immediately after the two arms start, brush 674 engages segment 685 and arm 701 makes a full rotation, energizng the five magnets 712 and relay 710 and then energizing power magnet 707, thus recording the code "letter shift" upon tape 720 before brush 674 leaves segment 685, and arm stops against the short end of armature 703 with start magnet 702 energized by current in circuit C.45. Soon thereafter, brush 674 engages the small blank segment 686 which is the start segment of the code group 690, thus opening circuit C.45 and deenergizing magnet 702 and starting the arm 701. The speeds of arms 701 and 671 are so related that brush 674 engages the code segments 1 to 5 in synchronism with the five successive engagements of arm 701 and the code segments 1 to 5 in distributor 700, thus producing in tape 720 a reproduction of the codes represented by the connection of the battery wire 742 in the code groups 690 to 695 and in the contacts of the letter relay 624, after which brush 676 engages the series of segments 683, closing the branch path of circuit C.56, which produces feed holes only in tape 720 sufficient to reach from perforator 74 to feelers 453 in the transmitter equipment of Fig. 6, so that means for controlling the blanking of tape such as are shown in the equipment of perforator 22 are not needed in the answerback equipment of Fig. 9.

When brush arm 671 is stopped in its first stop position as shown in Fig. 9 since magnet 672 is unenergized, it causes brushes 675 and 676 to disengage from segments 681 and 682, thus opening all holding circuits and deenergizing all magnets and relays of Fig. 9, including the magnet 416 of the message indicator 732. This opens contact 435 and deenergizes relay 432 of the message indicator 732. The contacts of relay 432 close circuit C.22 in the transmitting equipment 73, Fig. 1, and answerback message BOTIK BOTIK BOTIF perforated in the tape 720, will operate the selectors and transmitters as described above in time periods 7 to 15 inclusive. There will be no retransmission or reflection to the answerback message since the answerback message does not contain the code formula "shift H". The answerback message may contain additional detail as, for instance, for identifying the message then being acknowledged. The operator at station BOTIK may have concluded his message with the compound signature "shift H BOTIK BOTIK MESS 33" and the answerback message then would read, "BOTIK BOTIK MESS 33 BOTIF".

ACCOUNTING EQUIPMENT

Each substation 10, 11, 12 Fig. 1, is equipped with a device which records the operations of the printer magnet 13, Fig. 4, to an extent sufficient to enable the telegraph company's accounting department to make up a proper charge for services rendered. The accounting mechanism is shown in Figs. 13 and 14.

Upon a frame, not shown, are mounted a counting magnet 751, a number printing magnet 752, a code printing magnet 753, a counting mechanism 754, a fixed code platen 755, a pivot 756 for movable number platen 757, a pivot 760 for ratchet wheel 761, electrical contacts 762, ribbon idler wheels 763, 764, a pivot 765 for arm 766 carrying a ribbon idler 767 and a pivot 771 for arm 770 carrying a ribbon driving drum 772.

The counting device 754 may be of any desired type having printing wheels. It comprises four number printing wheels 773 each having ratchet teeth, the four ratchets being driven by four pawl teeth 774 fixed upon a single pawl arm 775. The number wheels are driven by a counter controlling arm 776 coaxial with the number wheels, which is operated in positive angular direction by power of spring 777 to operate the counting wheels 773. The arm 776 is operated in negative angular direction against the tension of its spring 777 by a roller stud 780 which is engaged successively by the three lobes of a cam wheel 781 attached rigidly to a ratchet wheel 782, which is rotated by a pawl finger 783 and is restrained by a detent 784. The number printing wheels 773 at all times present a number of four digits through an inking ribbon 785 to a record tape 786 and to the printing platen 757. The wheels 781 and 782 are fixed together to form a modulus wheel. Six letters, characters, or spaces are taken as forming one word for accounting purposes. Ratchet 782 is driven by pawl finger 783 which operates once for each letter, character or space, as will be described, and cam wheel 781 engages roller stud 780 and operates arm 776 until pawls 774 engage the next notch in the ratchets of the number wheels 773, after which the roller stud is released and spring 777 is permitted to operate the counting wheels. There are eighteen teeth on ratchet 782 and three lobes on cam wheel 781 so that ratchet wheel 782 counts letters, characters, and spaces, and cam wheel 781 operates counting wheels 773 to register words.

The ribbon 785 is an endless band passing around three idlers 763, 764, 767, and drum 772. A spring 787—a urges idler 767 away from drum 772 and thus keeps a tension on the inking ribbon. Drum 772 has a friction flange 790 which engages friction drum 791 attached to ratchet 761. By this means ribbon 785 is moved when ratchet 761 is operated, and a spring 787—b presses the flange 790 against the drum 791.

Magnet 751 has an armature 792 pivoted at 794 with a spring 793 and carrying a movable pivot 795 which in turn carries two pawl fingers, 783 for ratchet 782 and 796 for ratchet 761.

Magnet 752 has armature 800 pivoted at 801 with spring 802, carrying pivoted pawl 803 with spring 804 which engages teeth of the ratchet 761, the long tooth 805 in the ratchet 761 being normally under pawl finger 796. Ratchet 761 carries also a cam 806 which engages and opens contacts 762, which close at the first step of ratchet 761 from the normal position shown and remain closed for eighteen such steps, being then open for six steps. The ratchet 761 has twenty-two short teeth and one tooth 805 of double length. A link 807 connects the armature 800 to the number printing platen 757 which is pivoted at 756 and the tension of spring 802 acting through armature 800 holds platen 757 near tape 786 and opposite the printing faces of number wheels 773.

Five code printing magnets 753 have five code printing armatures 808 pivoted as shown at 818 and having five springs as 809, the five ends of the five armatures 808 being arranged in a row under tape 786 and opposite to fixed platen 755. Energization of any magnet 753 will cause the end of its armature 808 to strike the under surface of tape 786 and thus to print a dot upon the upper surface of the tape by pressing the tape and the ribbon against platen 755.

The accounting device is operated by control of electrical contacts added to the subscriber set, Fig. 4, by current from power mains 310, Fig. 4, the circuit connections being taken directly from the left-hand wire of the mains 310 and through the lower armature and front contact of relay 313 from the right-hand wire of the mains.

Fig. 14 shows the required contacts applied to a telegraph printer such as is shown in U. S. Patent 1,811,132 granted January 23, 1931. Such a printer comprises notched code bars 159 and a rocking shaft 120 carrying a printing operating bail 128. At each printing operation the code bars 159 are set in code combination and the operating bail 128 is moved and returned. Added to the printer mechanism are five electrical contacts 169 each of which is operated to close when and while its associated code bar is in marking signal position and above the operating bail 128 and positioned to be struck thereby are contacts 175 which contacts close momentarily in the time period that code bars 159 remain in their code positions.

In Fig. 14 the left-hand wire of power mains 310 is connected over wire 812 to windings of magnets 751 and 752 and also is connected to one of each pair of contacts 169. The right-hand wire of power mains 310 is connected through front contact and lower armature of relay 313 and over wire 813 to one of the contacts 175, to the winding of magnet 752, and through the contacts 175 and 762 and wire 811 to all five of the windings of the five code printing magnets 753. The remaining five terminals of the five windings of magnets 753 are connected by five individual wires 814 to five contacts 169.

OPERATION OF ACCOUNTING SYSTEM

In time period 1, relay 313 is energized and closes circuit C.60 extending from right-hand wire of power mains 310, front contact and lower armature of relay 313, wire 813, winding of magnet 752 and wire 812, to the left-hand wire of mains 310, to energize magnet 752 throughout the message, drawing platen 757 down by link 807 and causing armature 800 to give a starting step to wheel 761 by pawl 803, whereby cam 806 closes contacts 762.

In time periods 3 and 4 the first letter of the address is printed at the receiver, thus closing a code combination of the contacts 169. Circuit C.61 then is formed by contacts 175 through contacts of relay 313, wire 813, contacts 175, contacts 762, wire 811, magnets 753, wires 814, and contacts 169 in a code combination to operate magnets 753, and circuit C.62, through contacts of relay 313, wire 813, contacts 175, winding of magnet 751 and wire 812, is formed to energize magnet 751 to operate the two pawl fingers 783 and 796 toward the left. Ratchet 761 has been driven one step by pawl 803 and now pawl finger 796 drives ratchet 761 and drum 791 one step, pawl finger 783 also drawing upon a tooth in ratchet 782 and turning ratchet 782 one step. When a lobe of cam wheel 781 clears roller stud 780 on arm 776, then spring 777 will operate arm 776 to register an additional unit upon number wheels 773.

In time 5, successive codes will be recorded, ratchet 761 being driven by pawl finger 796, and when eighteen codes have been recorded the cam 886 on ratchet 761 engages and opens contacts 762, thus opening circuit C.61 and stopping all code printing. Ratchet wheel 761 continues to feed tape until the ratchet has made one complete rotation, when the long tooth 805 will reach pawl finger 796 and the pawl finger is no longer able to propel the ratchet. The last code record printed by the armatures 808 has passed beyond the type faces of number wheels 773 and blank tape is presented to the type faces for printing. Ratchet 761 stops, tape 786 and inking ribbon 785 stop. For each operation of the printing magnet thereafter throughout the message, magnet 751 is operated by circuit C.62 to turn ratchet 782 and to register upon the number wheels at every sixth ratchet tooth.

At the end of the message, the line of the substation is released and relay 313 is deenergized to release its armatures, opening circuit C.60 and deenergizing magnet 752, when spring 802 propels platen 757 against number wheels 773 and prints a number on tape 786.

BUSY TEST SYSTEM FOR SUBSTATION LINE

When line 15, Fig. 4, is seized by a final selector, relay 334 operates at once and by its top armature renders the line busy-by-test. When the final selector is released, slow relay 366 holds line 15 from battery 337 for a time sufficient for the armature of relay 313 to release. When calling, line 15 is made busy-by-test when switch 16 seizes a trunk 17 and magnet 332 is operated over circuit C.3. Upon release of line 15 by action of cut-off relay 351 energized by circuit C.19, slow relay 366 holds the line open for a period sufficient for the armature of relay 313 to release. This prevents the subscriber from starting switch 16 and seizing a trunk.

During the time interval from the operation of the calling key 301 to the seizing of the trunk and operation of the relay 332, line 15 is unguarded and a message upon a final selector may seize the line and the message will be recorded at substation 10. The seizure of line 15 and the opening of the line at the armature of relay 366 will deenergize relays 330 and 331, but a trunk 17 may be seized just at that time. Test circuit C.3 of the seized trunk will be open at the contacts of relay 333 and the primary communication circuit C.6 will be open at contacts of relay 332. If this is not effective, timing relay 349 operates its armature after ten seconds or any desired interval, and energizes cut-off relay 351 to effect release.

TRUNKS BETWEEN CENTRAL OFFICES

In Figs. 1 and 7 the equipment shown is located in the central office B. Trunk 60 is selected when the second letter of the address is Y and trunk 60 serves messages from central office BO to central office BY. Trunk 32, Fig. 1, serves messages from central office BY to central office BO. The operation of selector 34, Fig. 1 and Fig. 7, in response to a second-letter Y in the address will seize trunk 60 and operate relay 820, Fig. 7. Signalling circuit C.22 now extends through resistance 821 to ground and circuit C.37 extends through the receiving equipment 62 to ground, energizing relay 515, Fig. 6, which closes circuit C.38 to return rack 502 from its second step and contacts 504 then close circuit C.39 to start transmitter 25 without delaying for complete reading of the address. Circuit C.22 now becomes a holding circuit extending from ground 521, Fig. 6, to ground at resistance 821, Fig. 7, with current of 10 m. a. limited by resistances 520 and 821. Magnet 487 does not operate. Transmitter 25 then transmits the complete message to perforator 62, Fig. 7 and Fig. 1, perforating tape 822, the message being retransmitted by transmitter 64 as received, without awaiting the message-end signal. At the distant central office BY, the receiving relay such as 82, Fig. 1, operates a perforator 30 or 31 as described, recording the entire message including the repeated address. The message is now in that central office which contains the local telegraph line which is its destination and the operations of time period 3 and later follow as described herein for the message BOTIK. The system of transmission from transmitter 64 in central office BO to the receiving relay 82 in central office BY may be any suitable type of apparatus, land-line or cable, synchronous multiplex, carrier current, radio or otherwise. In some cases, the message may be repeated in an intermediate office so that again a recorder and transmitter may be encountered when the two codes "BY" have been set in the selectors, but each such recording and repeating, in the spirit of this invention, will bring the message nearer to its destination.

EXTENDED TRUNKS

Between offices in the same city the message may be expedited as compared with the trunking system described above. In Fig. 1 trunk 58 passes through apparatus 56 and then leads by trunk 84 to a nearby office where it terminates in a fourth selector such as 46. Circuit detail is shown in Fig. 12. At office BOT, a polar relay 830 has its winding and its make-before-break contacts connected in circuit C.22 and to trunk conductor 84. Its make-before-break armature is connected to ground and contacts are connected to message wire 58 of circuit C.37 and to trunk conductor 84. At the office BOY a slow release relay 831 has its winding connected between its armature and trunk wire 80, the winding being shunted by a resistance 832 and the circuit being completed through contacts of relay 831 and resistance 833 to battery and ground. Incoming trunk wire 84 is connected through relay contacts to an extension signal wire 834 and a further relay contact is connected through resistance 835 to battery and ground.

In operation, address letters BOY will cause third selector 40 in office BOT to select wire 829, Fig. 8, and thus to select trunk 58, Figs. 1, 8, and 12. Test relay 828, Fig. 12, now is operated. Signal circuit C.22 is extended over wire 836, winding of relay 830, contacts 840 of relay 830, trunk wire 84 to office BOY, contacts 842, 843 of relay 831, wire 834, Fig. 12, which leads to fourth selector 46, Fig. 1, see fourth selector 44, Fig. 8, magnet 572, arm 570, and ground as 637 in fourth selector 46, Fig. 1, in office BOY. The fourth letter of the address transmitted by transmitter 25, Fig. 6, will be effective over circuit C.22 through Fig. 12 as traced above, and will control the fourth selector in office BOY to select a final selector as 50 in office BOY. The fifth letter of the address likewise will be effective to adjust the final selector to select, test, and seize the desired line, thus forming a fragmentary circuit C.37 which may be traced from battery 844, Fig. 12, through resistance 833, closed contacts and then winding and shunt of relay 831, trunk wire 80 and so on to ground at the selected substation. Relay 831, Fig. 12, is energized to operate, thereby forming an extended circuit C.22 from ground 521, Fig. 6, through first, second, and third selectors, through winding and contacts of unoperated relay 830, trunk wire 84, contact 842, then armature and winding of operated relay 831 and leaving Fig. 12 in wire 80 of circuit C.37 to ground at the selected substation. The flow of current is limited to 10 m. a. by resistance 306, Fig. 4, until motor 300 attains full speed. Polar relay 830, Fig. 12, will not operate on 10 m. a.

The fragmentary circuit C.22 also is formed from ground, Fig. 12, through battery and resistance 835, contacts 845 and 843 of relay 831, and wire 834 through fourth and fifth selectors, to ground at 653, Fig. 4, of the selected telegraph line.

After the fifth code selection has been completed and the feelers 453, Fig. 6, have been withdrawn, tape 406 and rack 502 are advanced the fifth step. At the end of this step, the rack 502 shifts armature 509 to reverse the polarity of current in circuit C.22. The polar relay 830, Fig. 12, then will operate as soon as the resistance 306, Fig. 4, is shunted.

The action of the armature of relay 830 completes the signal circuit C.22 in final fragmentary form by closing the circuit from wire 836, Fig. 12, through the winding of relay 830, contact 840 and armature of relay 830 to ground. The contact 841 of relay 830 forms circuit C.37 for message transmission entering Fig. 12 over wire 58, through contact 841 of relay 830, trunk wire 84, contact 842 and armature, then winding and shunt of relay 831, and wire 80 to the fourth selector and thence to ground at the selected substation as described elsewhere for circuit C.37.

The contacts of relays 830 and 831 are especially designed to effect their switching functions without interrupting the continuity of either of the two parts of circuit C.22. In relay 831 circuit C.22 initially is from contact 842 through contact 843 and wire 834 to ground at the fifth selector. The operation of the armature of relay 831 first adds the circuit from contact 842, through the armature and winding of the relay and the wire 80 to ground, then removes battery 844, and then adds a further circuit from battery through resistance 835 and contact 845 to contact 843. The engagement between contact 842 and contact 843 then is broken, leaving two separated parts of circuit C.22, the first from wire 836 to wire 80 and the other from battery and resistance 835 to wire 834, without interrupting current through wire 836 or wire 834. In relay 830, the ground of the armature is added before the contact 840 is opened, so that current is not interrupted in the wire 836.

Upon the release of the connection, all relays and magnets are deenergized and their armatures are restored and all apparatus parts are returned to normal condition.

In the description above, an urgent message has been assumed with the resulting selection in Fig. 5 of the perforator 22, because the first impulse in the code of the first letter was an impulse of marking nature. For a message of deferred character, there is chosen a first letter having a spacing impulse for the first signal of its code, with the result that circuit C.12, which may be traced from ground 394 through contacts of relay 393, wire 392, winding of relay 410, winding of magnet 371, wire 397, segment No. 1, brush arm 385, wire 20, and wire 404 to contacts of repeating relay 360, is open at the contacts of relay 360, current does not flow and relay 410 is not energized as described for an urgent message to station BOTIF. Instead, one of the remaining impulses of the first-letter code must be of marking nature, and current will flow to energize relay 393 over circuit C.16 in perforator 22 and over a similar circuit in perforator 23, which may be traced from battery 400 through closed contacts of energized repeating relay 360, wires 404 and 21, brush arm 426, segment No. 2 or 3 or 4 or 5, wire 427, winding of magnet 425, winding of magnet 393, wire 422 and contacts of relay 410 to ground 429. Relay 393 is energized and opens all circuits in perforator 22, after which the operation of perforator 23 follows as described for perforator 22, to record the message upon tape 419. Selection follows, using first selector 27, Fig. 1, selects 35 or 37 as a second selector, thereby being debarred from the long trunks BY at such times as the switches 155 are open, as a result whereof the deferred message is delayed in deference to urgent messages from selectors 34 and 36. Further operations are as described for an urgent message.

Although the invention has been described in connection with a specific form thereof, it will be understood that it has further applications and it is not intended to be limited in scope by the embodiment shown herein for illustration.

The invention claimed is:

1. In a telegraph system, the method of transmitting a telegraph message which comprises, converting the message into a control-form, combining under control of the form a plurality of part-paths to form a complete path to the place of destination of the entire record of the control-form, and thereafter transmitting the message over the path so formed.

2. In a telegraph system, the method of transmitting a telegraph message which comprises, converting the message into a control-form, selecting automatically under control of the form a path to the place of destination of the message, and thereafter transmitting the entire record of the control-form over the selected path, under control of the form.

3. In a telegraph system, the method of transmitting a telegraph message which comprises, converting the message into a control-form in which form the message comprises two parts, an address part and a remainder part, selecting under control of the address part of the message a path to the destination of the message, and thereafter transmitting both parts of the message over the selected path.

4. In a telegraph system, the method of transmitting a telegraph message which comprises, converting the message into a control-form in which form the message comprises two parts, an address part and a remainder part, combining under control of the address part of the message a plurality of part-paths to form a complete path to the place of destination of the message, and thereafter transmitting both parts of the message over the path under control of the form.

5. In a telegraph system, a recorder for producing a control-record, telegraph lines, automatic switches for connecting said lines in variant combinations, a signal-sender adapted to operate under control of said record to send signals over some of said lines to control said switches to connect others of said lines in a combination determined by said record, and a further signal-sender adapted to operate under control of said record to send signals over the lines connected by said switches.

6. In a telegraph system, a recorder for producing a control-record; telegraph lines, automatic switches for connecting said lines in variant combinations, a signal-sender adapted to operate under control of said record to send signals over some of said lines to control said switches to connect others of said lines in a combination determined by said record, and means operating under control of said record to send signals over the lines connected by said switches.

7. In a telegraph system, a recorder for producing a control-record, telegraph lines, automatic switches for selecting among said lines and for connecting selected lines, and a signal-sending mechanism operating under control of said record and operating to send signals over selected lines to select and connect further lines and to send printing telegraph signals over selected and connected lines.

8. In a telegraph system, a recorder for producing a control-record, telegraph lines, automatic switches for connecting said lines in variant combinations, a signal-sender under control of said record to send permutation code signals over some of said lines to control said switches to connect others of said lines in a combination as determined by said record, a printing-telegraph receiver, and means under control of said record to send permutation code signals over the lines connected by said switches to operate said printing-telegraph receiver.

9. In a telegraph system, a recorder for producing a control-record comprising an address part and a remainder part, telegraph lines, automatic switches controlled by the address part of said message-record for selecting among said lines and for connecting selected lines to form an electrical communicative path, and a signal-sending mechanism operating under control of both parts of said control-record and operating to send printing-telegraph signals over selected and connected lines constituting said path.

10. In a telegraph system, a recorder for producing a control-record, telegraph lines, a signal-sender under control of said record to send signals over said lines, wholly automatic means under control of signals from said signal-sender to create a further control-record, different from said first mentioned control-record, and means to transmit the entire record of said further control record.

11. In a telegraph system, a recording mechanism wholly under control of signals composing a telegraph message and operating in response to said signals to create a further message different from the message composed by the controlling signals, and means to transmit the entire further message.

12. In a telegraph system, a control-record, telegraph lines, automatic switches for connecting said lines in variant combinations, means under control of said record to send permutation code signals to control said switches to connect said lines in a combination as determined by said record, a printing-telegraph receiver, and means under control of said record to send permutation code signals over said lines when connected by said switches to operate said printing-telegraph receiver.

13. In a telegraph system, a first control-record, a signal-sender under control of said record to send signals, wholly automatic means under control of signals from said signal-sender for creating a second control-record different from said first record, and means for transmitting the entire record of said second control record.

14. In a telegraph system, a telegraphic substation, a control-record, switching mechanism wholly under control of said record and operating to select said substation, a telegraphic signal-sender, and means at said substation to prevent said signal-sender from operating while said substation is not in operating condition.

15. In a telegraph system, the method of rendering telegraph service which comprises, converting a message into a control-form, selecting automatically under control of the form a path to the destination of the message and thereafter transmitting the message over the selected path, recording the signature of the message automatically in control-form at the central office of the destination of the message, selecting automatically under control of the recorded signature a return path to the source of the message, and thereafter retransmitting the signature to the source as indication of the successful transmission of the message.

16. In a telegraph system, the method of transmitting a telegraph message which comprises, selecting a path to the destination of the message, thereafter transmitting the message over the path so formed, compiling automatically a return acknowledgment message, automatically selecting a return path, and automatically transmitting the acknowledgment message thereover.

17. In a telegraph system, the method of transmitting a telegraph message which comprises, converting the message into a control-form in which form the message comprises three parts, an address part, a body part, and a signature part, selecting automatically under control of the address part of the message a path to the destination of the message, thereafter transmitting all parts of the message over the selected path, selecting automatically under control of the signature part of the message a return path, and thereafter transmitting automatically a confirmatory message thereover.

18. An automatic switching system for telegraph messages comprising central and subscriber's stations, lines connecting said subscriber's stations to said central stations, trunks connecting said central stations together, means at a central station and under control of the address of a message for directing the message to a second central station, means to transmit the message automatically to the second central station and then to disconnect the trunk, and means at the second central station to use the address again for directing the message to further trunks and to further central stations and ultimately to a receiving station in accordance with the address and to transmit the message thereto.

19. An automatic switching system for telegraph messages comprising central stations, circuits in said central stations, circuits connecting said central stations together, subscriber's stations, circuits connecting said subscriber's stations to said central stations, automatic means under control of the address of a message for interconnecting the central station and substation circuits and for transmitting the message, automatic terminal means for said circuits to store the received message and for disconnecting the circuit over which the message was transmitted, means for retransmitting the message farther in a similar manner, and further means to retransmit the message to its destination in a similar manner.

20. In an automatic switching system for telegraph messages, recording means responsive to a received message to record the signature thereof, and transmitting means responsive to said record to transmit an answerback message in accordance with the signature.

21. In a telegraph system, stations, lines connecting said stations, automatic switches connecting said lines, telegraphic transmitters and receivers connected to said lines, and means responsive to the reception of a blank signal code to disconnect the lines over which the code was received.

22. In a telegraph system, an automatic recorder responsive to the start of a message to begin to operate, means in said recorder to record the destination and class of service of the message, and further means in said recorder to count the words of the message and to record the count.

23. In a telegraph system equipped with an attendant's desk, apparatus for automatically routing and transmitting messages under control of the recorded code address of each message, means for detecting a non-code address and for routing such an address to the attendant's desk where a proper code address may be supplied to the message.

24. In a telegraph system, central offices, lines connecting said central offices, automatic switches for interconnecting said lines under control of message records, circuits of a first class over which switch-controlling signals are transmitted, circuits of a second class over which communication signals are transmitted, and a single wire connecting two central offices over which a circuit of first class is completed for setting up a message circuit and subsequently over which a circuit of second class is completed for transmitting a message.

25. In a telegraph system, automatic switches, telegraph receivers, link lines eligible for selection by said automatic switches and extending to other automatic switches, lines eligible for selection by said automatic switches and extending to telegraph receivers, and selection controlling means operable to control said automatic switches serially to extend a connection link-by-link until a telegraph receiver is selected and operable thereafter to hold the connection to the receiver without further selection of switches.

26. In a telegraph system, a method of operation including the steps of perforating the address of a called station in coded form, establishing a communicating circuit with the called station automatically in accordance with the perforated address, transmitting over the established circuit the message with the signature of the sender, and transmitting to the sender the coded address of both the sender and of the called station.

27. In a telegraph system, a method of operating including the steps of recording the address of a called station, determining the class of service by the character of the recorded address, and establishing a communication circuit with the called station automatically in accordance with the recorded address.

28. In a telegraph system, a method of operation including the steps of recording the address of a called station in duplicate, sensing the duplicate address for accuracy, and establishing a communicating circuit with the called station automatically in accordance with the recorded address.

29. In a telegraph system, a plurality of stations, circuit connections between said stations, means at one of said stations for recording the address of a called station and the message to be transmitted thereto, and apparatus at said stations responsive to the recorded address for establishing a communication circuit between the stations over said connections and over which the entire record is transmitted.

30. In a telegraph system, a plurality of branch stations, a plurality of central offices, circuit connections between said central offices and the branch stations and the offices, means at the central office responsive to a branch station for recording the address of another branch station, and means at said central office responsive automatically to the recorded address for establishing a communicating circuit with another central office and a branch station thereof.

31. In a telegraph system, a plurality of branch stations, a plurality of central offices, circuit connections between said central offices and the branch stations, a plurality of recorders at said central offices, means responsive to one of said branch stations for selecting a recorder to record the address of a called station, and apparatus at the central station responsive automatically to the recorded address for establishing a communication circuit over a connection between the central offices and the called branch station.

32. In a telegraph system, a plurality of branch stations, a plurality of central offices, circuit connections between said central offices and the branch stations, a plurality of recorders at said central offices, means responsive to one of said branch stations for selecting a recorder to record the address of a called station, apparatus at the central station responsive automatically to the recorded address for establishing a communication circuit over a connection between the central offices and the called branch station, and means at the called branch station for recording the message from the distant branch station and the address of the calling and called stations.

33. In a telegraph system, a plurality of branch stations, a plurality of central offices, circuit connections between said central offices and the branch stations, a recorder at the central offices, means responsive to one of said stations for selecting a recorder to record the address of a called station, apparatus at the central station responsive automatically to the recorded address for establishing a communicating circuit over a connection between the central offices and the called branch station, means at the called central office for recording the addresses of the calling and called stations, and means responsive to the recorded addresses of the calling and called stations for transmitting these addresses to the original calling station.

34. In a telegraph switching system, a plurality of telegraph lines, terminal equipment for some of said lines comprising automatic selecting switches for selecting further lines, terminal equipment for others of said lines comprising telegraph receiving apparatus, controlling equipment operable to send signals over a selected line to control an automatic selecting switch, and means associated with said telegraph receiving apparatus for preventing further operation of said controlling equipment after said line equipped with receiving apparatus has been selected.

35. In an automatic switching system for telegraphs, a central office, a sub-central office, a substation, lines in said central office and terminating in automatic switches for selecting other lines, a line from said central office to said sub-central office and terminating in said sub-central office in automatic switches for selecting other lines, lines in said sub-central office and terminating in automatic switches for selecting other lines, a line from said sub-central office to said substation and terminating in telegraphic receiving apparatus at said substation, and signal-sending devices in said central office to send signals first to control said automatic switches over the circuits of selected lines and then to operate said telegraph receiving apparatus over selected lines, the said line from said central office to said sub-central office being a single-circuit line used at first for signals to control said automatic telegraphic switching apparatus and subsequently for signals to operate said telegraphic receiving apparatus at said substation.

36. In a telegraph system, a substation, a line connected thereto, a control form, switching mechanism under control of said form to select said line and said substation, a test mechanism responsive to the idle condition of said line, a further test mechanism responsive to the operative condition of said substation, and signal transmitting mechanism depending for its operation upon suitable response by said test mechanism and by said further test mechanism jointly.

37. In an automatic switching system, a telegraph line, a test mechanism responsive to an idle condition and unresponsive to a busy condition of said line, means for continuously engaging said test mechanism with said line when busy so that said test mechanism may respond to seize said line when said line becomes idle, a duplicate test mechanism, means for continuously engaging both of said test mechanisms contemporaneously with said line when said line is busy, both of said mechanisms then operating to disengage themselves from said line when said line becomes idle.

38. In a telegraph system, a plurality of branch stations, a plurality of central offices, circuit connections between said central offices and the branch stations, a recorder at each of the central offices responsive to establishing a call at a branch station for recording the address, message, and signature, means for sensing the recorded information to establish automatically in accordance with the recorded address a communication circuit over the connections to a called branch station, apparatus at the branch station for recording the message including the address of the called and calling stations, and means responsive to each message for recording the address and the number of chargeable words of the message.

39. In a telegraph system, a plurality of stations, circuit connections between said stations, means at said stations for recording in a tape the address in duplicate of a called station, message, and signature, means for sensing the duplicate address for exactness, mechanism for returning the tape to its starting position for resensing the tape if the address is found to be an exact duplicate, automatic switching apparatus responsive to the address for establishing a communication circuit over said connections, and means at the selected station operative over said connections for recording the address, message, and signature.

40. In a telegraph system, the method of transmitting a telegraph message which comprises, receiving the message from the calling station over a first communication circuit, recording in a control-form the address, the body, the signature and a message-end signal and storing the control-form until the message-end signal is received, disconnecting the first communication circuit under control of the message-end signal, and establishing invariably after such disconnection a communication circuit with the called station automatically under control of the recorded address and retransmitting the message thereover.

41. In a telegraph system, the method of transmitting a telegraph message which comprises, receiving the message over a communication circuit, recording the message, storing the record until the message is completely received, disconnecting the used communication circuit, establishing invariably after such disconnection another communication circuit automatically under control of the recorded message, and retransmitting the message thereover.

42. In a telegraph system, a first substation, a central station, a second substation, a first line connecting said first substation to said central station, a second line connecting said second station to said central station, a telegraphic transmitter at said first substation, a definitive telegraphic receiver at said second substation; and at said central station: an intermediate recording receiver, an automatic switch under control of said first substation for connecting said first line and said first substation to said intermediate recording receiver and for subsequently disconnecting them from each other, a message record produced by said intermediate recording receiver under control of said first substation, other automatic switches controlled by said record after said first substation and said intermediate recording receiver have been disconnected from each other and operating to select and connect said second line, a retransmitter controlled by said message record after said first substation and said intermediate recording receiver have been disconnected from each other, and connected to said second line by operation of said other automatic switches, and operating to retransmit to said definitive telegraphic receiver at said second substation over said selected second line and under control of said message record.

43. In a telegraph system, telegraphic substations, a central station, lines connecting said substations to said central station, a recording receiver, means to connect one of said substations to said receiver, to produce a message record at said receiver under control of the connected substation and subsequently to disconnect said recording receiver from said substation, and means controlled automatically by said message record invariably after said disconnection to select and connect a further one of said substations, and to transmit thereto.

44. In a telegraphic central office, radial lines, a recording receiver, means controllable over one of said lines to connect one of said lines to said receiver for producing a message record and to disconnect said receiver from the connected line, and means controlled automatically by said message record after said disconnection to select and connect a further one of said lines and to transmit thereover.

45. In a telegraph system, a central station, radial lines, a receiving recorder, an automatic switch connecting one of said lines to said recorder to record a message, a retransmitter controlled by said message, and means responsive to a received signal to disconnect said recorder and to start said retransmitter.

46. The method of transferring a telegraph message between two points which consists in electrically transmitting directing signals and signals representing the message in successive stages between said points through a plurality of intermediate points, utilizing one of said directing signals at each of said intermediate points to determine the succeeding electrical transmission path, and transmitting all of the directing signals and the message signals over the selected path.

47. The method of selectively transferring a telegraph message to a predetermined destination which consists in electrically transmitting a succession of signal combinations representing the message together with a succession of directing signals collectively representing said destination and individually representing successive relay points through which said message is to be dispatched, recording said combinations in mechanical form at each successive relay point, utilizing one of said direction signals to control the automatic selection of a transmission path leading to the succeeding point, testing the selected path, and effecting retransmission automatically when the path becomes available of the message signals including all of the direction signals.

48. In telegraph apparatus, the combination of a storage medium adapted to contain a succession of signals and representing a message having a directing portion, a body portion, and an end-of-message portion, means operable under the control of the directing portion to select a transmission path, means for transmitting the several portions over the selected path, and means operating under the control of the end-of-message portion to free the selected path.

49. In a telegraph apparatus, the combination of means for storing signals representing a message, a plurality of transmission paths, a signal responsive mechanism for selecting and connecting several of said paths to form a communication path, a transmitter, and means controlled by said mechanism for initiating the operation of said transmitter to send said message over the communication path selected thereby.

50. A printing telegraph switching system comprising a line, means for transmitting a succession of permutation code signals over said line, a plurality of other lines, and a permutation telegraph selector directly responsive to certain of said permutation code signals for connecting said first line selectively to any one of said other lines.

51. A printing telegraph switching system comprising a line, means for transmitting a succession of code signals over said line, a plurality of associated lines, a multi-contact selector having a contact individual to each of said associated lines, said selector being selectively operable by code signals utilized for recording characters, and means controlled by said selector for connecting said first line to a desired one of said associated lines.

52. A printing telegraph switching system comprising a line, means for transmitting permutation code signals over said line, a plurality of associated lines, and means common to all of said lines including a plurality of permutation bars set in response to said permutation code signals, a selectable element selected upon the permuted setting of said bars, and means operated through said elements for connecting and disconnecting said first line selectively to and from said associated lines.

53. A printing telegraph switching system comprising a plurality of lines, and a permutation selector responsive to a single permutation code signal received over one line for directly connecting said line selectively to any other of said lines.

54. A printing telegraph switching system comprising a plurality of lines, and means responsive to different permutation code signals for selectively connecting one of said lines to and disconnecting it from any of said other lines.

55. In a telegraph system, a recorder for producing a control record, telegraph lines, a signal sender under control of said record to send signals over said lines, and wholly automatic means under control of signals from said signal sender to create a further control record addressed to a destination different from the destination of said first mentioned control record.

56. In a telegraph system, the method of transmitting a telegraph message which comprises, converting the message into groups of signal impulses, combining under control of certain of the groups of signals a plurality of part paths to form a complete path to the place of destination of the message, and thereafter transmitting the entire message including the path selecting parts thereof over the path so formed.

57. In a telegraph system, the method of transmitting a telegraph message which comprises, converting the message into groups of signal impulses, selecting automatically under the control of certain of the groups of signals a path to the place of destination of the message, and thereafter transmitting the entire message including the path selecting part thereof over the path so formed.

58. In a telegraph system, the method of transmitting a telegraph message which comprises converting the message, which comprises two parts, an address part and a remainder part, into groups of signal impulses, selecting under control of the address part of the message a path to the place of destination of the message, and thereafter transmitting both parts of the message over the selected path.

59. In a telegraph system, the method of transmitting a telegraph message which includes the steps of converting the messages at each of a plurality of subscribers' lines into groups of signal impulses, transmitting the impulses of the respective messages over different subscribers' lines to a central station, converting the respective messages into separate control forms, and successively and automatically transmitting from said control forms corresponding signal impulses over a single communication channel extending from said central station.

60. In a telegraph system, a plurality of subscribers' lines extending to a central station, means connected with each subscribers' line for converting messages into groups of signal impulses and for transmitting such impulses over the respective lines to the central station, reperforators at the central office responsive to the impulses transmitted over said lines for producing control forms, transmitters for said perforators controlled by the respective forms, a single communication channel extending from said central station, and means for successively and automatically connecting said transmitters with said communication channel.

61. In a telegraph system, a plurality of subscriber's lines, a central station in which said lines terminate, a plurality of reperforators at said central station operable in response to code signals transmitted over said subscribers' lines, a line extending from said central station, a transmitter associated with each reperforator, a distributor for distributing signal impulses in accordance with the operation of the transmitters by tape supplied from its reperforator, and means for individually connecting said transmitters with said line extending from the central station.

62. In a telegraph system, a plurality of subscribers' lines, a central station in which said lines terminate, a plurality of reperforators at said central station operable in response to code signals transmitted over said subscribers' lines, a line extending from said central station, a transmitter associated with each reperforator, and means for individually connecting said transmitters with said line extending from the central station.

63. In a telegraph system, a transmitting station, a plurality of receiving stations, a central station, a line conductor connecting said transmitting station with said central station, line conductors connecting said central station with said receiving stations, switching apparatus at said central station responsive to a single permutation code signal for connecting any one of said receiving station lines with the line of said transmitting station, and a receiving printer at the receiving station responsive to impulses transmitted from said transmitting station over the connected line conductors.

64. In a telegraph system, a transmitting station, a central station, a line connecting said stations, a plurality of lines extending from said central station to substations, switching means at said central station responsive to character recording signals originated at said first station for switching and connecting said stations over said lines through said central station, and means at said substation operative to record the character signals utilized to switch the lines of the substations.

65. In a telegraph system, a central station, a plurality of subscribers' lines radiating from said central station, a message station, a line conductor connecting said central and message stations, means responsive to character recording signal conditions to connect said last mentioned line with any of said subscribers' lines to permit said message station to communicate directly with the subscribers over said subscribers' lines.

66. A printing telegraph switching system comprising a line, means for transmitting a succession of permutation code signals over said line, a plurality of associated lines, switch means for connecting said first line to one of said associated lines, said switching means normally being non-responsive to code signals transmitted over the first line and means responsive to a special permutation code combination of impulses for rendering said switching means directly responsive to a succeeding regular character code combination of impulses to connect the first line with one of said associated lines.

67. A printing telegraph switching system comprising a line, means for transmitting code signals over said line, a plurality of associated lines, a selecting device for each of said associated lines, arranged to connect said first line thereto and means controlled by certain of said code signals for operating a predetermined selecting device to connect said first line with a desired one of said associated lines and means controlled by other code signals for disconnecting said first line from said associated lines.

68. A printing telegraph switching system comprising a line, means for transmitting a succession of permutation code signals over said line, a plurality of associated lines and means responsive to a single predetermined permutation code signal for connecting said first line selectively to any one of said associated lines.

69. A printing telegraph system comprising a line, means for transmitting a succession of telegraph code combinations of impulses over said line, a plurality of associated lines, and means including a rotary distributor controlled by certain code combinations from said transmitting means to connect said first line selectively to one of said associated lines.

70. In a telegraph system, a recorder for producing a control-record, telegraph lines, a signal-sender under control of said record to send signals over said lines, and wholly automatic means under control of signals from said signal-sender to create a further control-record, different in address and in signature from the first control record.

71. In a telegraph system, a recording mechanism wholly under control of signals composing a telegraph message and operating in response to said signals to create a further message different in address and in signature.

72. In a telegraph system, a first control-record, a signal-sender under control of said record to send signals, and wholly automatic means under control of signals from said signal-sender for creating a second control-record addressed to a different destination from said first record.

73. In a telegraph system, a recorder for producing a control-record, telegraph lines, a signal-sender under control of said record to send signals over said lines, and wholly automatic means under control of signals from said signal-sender to create a further control-record, different from said first mentioned control-record and additional to and thereafter independent of said first-mentioned control-record which is transmitted fully.

74. In a telegraph system, a recording mechanism wholly under control of signals composing a telegraph message and operating in response to said signals to create a further message different from the message composed by the controlling signals and additional to and thereafter independent of said first-mentioned message which is transmitted fully.

75. In a telegraph system, a first control-record, a signal-sender under control of said record to send signals, and wholly automatic means under control of signals from said signal-sender for creating a second control-record different from said first record and additional to and thereafter independent of said first-mentioned control-record which is transmitted fully.

76. In a telegraph system, a recorder for producing a control-record, telegraph lines, a signal-sender under control of said record to send signals over said lines, wholly automatic means under control of signals from said signal-sender to create a further control-record, different from said first mentioned control-record and additional to the message of said first-mentioned control-record, and means for thereafter transmitting said additional control-record independently of said first-mentioned record.

77. In a telegraph system, a recording mechanism wholly under control of signals composing a telegraph message and operating in response to said signals to create a further message different from the message composed by the controlling signals and additional to the message of said first-mentioned control-record, and means for thereafter transmitting said additional control-record independently of said first-mentioned record.

78. In a telegraph system, a first control-record, a signal-sender under control of said record to send signals, wholly automatic means under control of signals from said signal-sender for creating a second control-record different from said first record and additional to the message of said first-mentioned control-record, and means for thereafter transmitting said additional control-record independently of said first-mentioned record.

79. In a telegraph switching system, a central office, a substation, a single line circuit connecting said central office and said substation, a calling key in said line circuit at said substation, a line relay in said line circuit at said central office having a connective contact responsive to said calling key, a connector switch at said central office, a seizing relay associated with said line having cut-off contacts responsive to said connector switch, and a circuit including said connective contacts of said line relay and said cut-off contacts of said seizing relay for rendering said connective contacts ineffective when said seizing relay is energized simultaneously with said line relay.

80. In a telegraph switching system, a central office, a substation, a line connecting said central office and said substation, a calling key at said substation, a line relay at said central office responsive to said calling key over said line to set up a calling condition, a connector switch, and seizing means operative to seize said line for connection through said connector switch at any instant in the continuance of said calling condition.

81. In a telegraph switching system, telegraph substations, a central office, lines connecting said substations and said central office, a locking key at a substation to establish a calling condition upon a connecting line, a connective switch at said central office responsive to said calling condition, a connector switch at said central office having means to seize said line, and means to unlock said key responsive to said connective switch and responsive alternatively to said connector switch.

82. In a telegraph switching system, a plurality of telegraph substations, a central office, lines connecting said substations to said central office, a locking calling key in circuit with a connecting line at a substation to establish a calling condition upon said connecting line, an unlocking member in said locking key for terminating said calling condition, connector switches at said central office, means in said connector switches to connect said switches with said line, and transmitting means connected to said connector switches for transmission over said connected line, said unlocking member being responsive to said transmitting means to unlock said locking key and to relieve said calling condition.

83. In telegraph switching system, a plurality of telegraph substations, a central office, lines connecting said substations to said central office, means including a calling key connected to a line at a substation and a relay connected to said line at the central office to establish a calling condition upon said connecting line, switching means connected to said connecting line at the central office including searching means responsive to said calling condition, a connector switch connected to said line at the central office including means to seize said line for connection, said means to seize being operable during operation of said searching means, and means connected to said line and responsive to said seizing means for terminating said calling condition.

84. In a telegraph system, a method of operation including the steps of recording an address, a message and a signature in a control form, establishing a transmission circuit automatically in response to the recorded address, transmitting the message, and retransmitting to point of origin of the message an answer-back message in which the address of the answer back is controlled by the signature of the message and in which the signature of the answer back is controlled by the line to which the message has been delivered.

85. In a telegraph switching system, a method of operation including the steps of transmitting through a switching point to a terminal line a message having a signature, recording the signature upon a control form before completing transmission of the message, completing the control form after completing transmission of the message by adding a record of the identity of the terminal line, and transmitting a further message under control of the form.

86. In a telegraph system, a method of operation including the steps of transmitting from a point of origin to a point of destination two messages, and automatically transmitting from the point of destination to the point of origin one of the said two messages.

87. In a telegraph system, a recording mechanism under control of signals composing a telegraph message and operating in response to said signals to create a further message different in address, and automatic mechanism to complete said further message under control of line equipment of a line over which said message has been transmitted.

88. In a telegraph switching system, a method of operation in response to a calling line comprising the steps of connecting a calling line, recording a message received from the calling line, disconnecting the calling line, retransmitting the recorded message, automatically formulating a reply message, automatically reconnecting the calling line, and automatically transmitting thereover the reply message.

89. In a telegraph switching system, a plurality of telegraph lines, a central station, an automatic switch at the central station connected to said lines for selecting any one of said lines, and signal generating means at the central station associated with said switch and operating to generate signals which will identify a selected line.

90. In a communication system, an automatic recorder responsive to an initial condition of a message to begin to operate, means to record in said recorder the destination of a message, and means to record automatically in said recorder data concerning the accounting value of the message.

91. In a telegraph system, an automatic recorder responsive to an initial condition of a message, means to record in said recorder the destination of a message, and automatic means to compile and to record in said recorder data concerning the accounting value of the message.

92. In a telegraph system, an automatic recorder responsive to an initial condition of a message, means to record in said recorder the destination of a message, and counting means in said recorder responsive to completion of each unit-charge increment in chargeable value of a message.

93. In a communication system, a recorder, means in said recorder automatically responsive to beginning of a message and to ending of a message, and means in said recorder automatically responsive to completion of each chargeable unit of said message, said means jointly effective to produce in response to each message an individual record showing the chargeable length thereof.

94. In a communication system, a substation, a central office, a line connecting said substation and said central office, a recorder associated with said line, and means in said recorder to record the address and the message length of every message transmitted over said line.

95. In a telegraph switching system in which switching is controlled by control forms each having duplicate addresses, means responsive to a control form for sensing the duplicated addresses, means for comparing the several responses, and means for establishing a transmission circuit under control of the sensed control form in case the several compared responses are identical.

96. In a telegraph switching system, means to record duplicate addresses in a control form, sensing means responsive to said control form to sense said addresses simultaneously, comparing means to compare simultaneous responses of said sensing means, and means to arrest operation of said sensing means, responsive to said comparing means in case said simultaneous responses are different.

97. In a tape-controlled telegraphic switching system, means to sense a portion of a control tape, means to transmit signal impulses over a first path under control of said sensing means, means to return said tape automatically to initial sensing position, and means to transmit signal impulses over a second path under control of resensing of said tape by said sensing means.

98. In a tape-controlled telegraphic switching system, means to sense a predetermined length of a control tape, means effective thereafter to return said tape automatically to initial sensing position for resensing, first transmission means responsive to records sensed in said predetermined length of control tape, and further transmission means responsive to all records in said control form in response to resensing of said tape by said sensing means.

99. In a telegraph system, two alternative service circuits over which a received message may be retransmitted to its sole destination, and selective means controllable by said received message and operating to select one of said circuits in accordance with selective data contained in said message.

100. In a telegraph switching system, a plurality of recorders by which a received message may be recorded, selective means operating to select one of said recorders in response to a signal contained in said message, and retransmitters, one with each of said recorders and having differing accounting values, for retransmitting said received message to its sole destination.

101. In a telegraph system, a substation, a central station, a line connecting said substation and said central station, means at said substation responsive to an operative condition of said substation to change the resistance of the circuit of said line, an automatic transmitter at said central office connected to said line, and means at said central office responsive to said change in resistance of the circuit of said line to start said transmitter.

102. In a telegraph system, a substation, a central office, a line connecting said substation and said central office, an automatic switch at said central office connected to said line, a transmitter at said central office connected to said switch, busy test mechanism responsive to an idle condition of said line to connect said line through said switch to said transmitter, means at said substation responsive to an operative condition of said substation to change an electrical constant of said line, and means at said central office responsive to said change in said line to start said transmitter.

103. In an automatic switching system, a telegraph line, a test mechanism responsive to an idle condition of said line, means for rendering said line busy-by-test, and means for continuously engaging said test mechanism with said line when said line is in busy-by-test condition.

104. In an automatic switching system, a telegraph line, means responsive to a substation-to-central message condition to seize said line, and means responsive to a central-to-substation message condition to connect with said line, said second-mentioned means having precedence over said first-mentioned means in case that both means are operated simultaneously.

105. In an automatic switching system, a telegraph line, means responsive to a substation-to-central message condition to seize said line, means responsive to a central-to-substation message condition to connect with said line, means included in said second-mentioned means whereby said second-mentioned means has precedence over said first-mentioned means in case that both means are energized simultaneously, and means for energizing both of said means simultaneously in case both conditions are concurrent at the time of restoring a line to service after a period of use thereof.

106. In a telegraph system, the combination of an originating point, an intermediate point, and a plurality of terminal points, means at the originating point for transmitting to the intermediate point a succession of messages each including a direction signal in the form of a preconcerted signal combination and a plurality of signal combinations representing the body of the message, means for storing the messages at said intermediate point, a plurality of line conductors of which single line conductors extend from said intermediate point to each of said terminal points, means for selecting in accordance with the permutational character of the direction signals in said storage means a single line conductor extending from said intermediate point to the terminal point identified by said direction signal, and means operative after the selection of the single line conductor for transmitting successively impulses representing the body of the message as stored in said storage means.

107. In an automatic telegraph system, the combination of an originating point, an intermediate point, and a plurality of terminal points, means at the originating point for transmitting to the intermediate point a succession of messages each including a direction signal in the form of a preconcerted signal combination and a plurality of signal combinations representing the body of the message, a tape perforator at said intermediate point operative for storing the messages at said intermediate point, a plurality of single line conductors extending from said intermediate point to said terminal points, means responsive selectively in accordance with the permutational character of the direction signals stored in said tape through the operation of said tape perforator for selecting a single line conductor extending to the terminal point identified by said direction signal, and means operated in accordance with the perforations in said tape following the selection of the single line conductor extending to the desired terminal point for transmitting impulses over said line conductor to said terminal point representing the body of the message.

108. In an automatic telegraph system, the combination of a transfer point, means for transmitting to said transfer point a series of messages, each including a directing signal of a predetermined code combination and a plurality of signal combinations representing the body of a message, means at said transfer point for storing said messages, a plurality of terminal points, a plurality of single line conductors each connecting one of said terminal points with said transfer point, means operative in response to the permutational character of the directing signals of the messages stored in said storing means to select one of said line conductors extending to a desired terminal point, and means responsive to the signal combinations representing the body of the message for transmitting over said selected single line conductor in succession for each signal combination signal impulses representative of the characters of the message.

109. In an automatic telegraph system, the combination of an originating point, an intermediate point, and a plurality of terminal points, a plurality of single line conductors each connecting one of said terminal points with said intermediate point, means at the originating point for transmitting to the intermediate point a succession of messages each including a direction signal in the form of a preconcerted signal combination and a plurality of signal combinations representing the body of the message, means at said intermediate point for storing said messages, means also at said intermediate point operative in accordance with the permutational character of said direction signals to select one of said line conductors extending from the intermediate point to one of the terminal points, and means operative thereafter in accordance with the message signals stored in said storing means for transmitting over said selected single line conductor to said terminal point in succession the impulses of the signal combinations representing the body of the message.

110. In a telegraph system, a central station, a telegraph line extending from a remote station to said central station, means at said central station responsive to code combinations of impulses transmitted from said remote station over said telegraph line for preparing a record of said impulses, a plurality of telegraph lines extending from said central station to said remote stations, selecting means including a plurality of permutation bars responsive to certain of the impulses recorded in said record through the operation of said recording means, means individual to each of said plurality of lines selected upon the permuted setting of said permutation bars to select one of said plurality of lines, and means operative following the selection of the line for transmitting impulses in accordance with the control indicia on said record.

111. In an automatic telegraph system, the combination of an originating point, an intermediate point, and a plurality of terminal points, a single line conductor connecting said originating point and said intermediate point, means at the originating point for transmitting to the intermediate point a succession of messages each including direction signals in the form of predetermined signal combinations and a plurality of signal combinations representing the body of the message, a plurality of tape perforators at said intermediate point operative for storing said messages at said intermediate point but normally disconnected from said line conductor, means to connect said perforators concurrently to said line conductor, means responsive to the permutational nature of one of said direction signals of a message to retain but a selected one of said perforators in operative condition for storing the message, a plurality of single line conductors extending from said intermediate point to said terminal points, and means responsive selectively in accordance with the permutational character of said direction signals stored in said tape for selecting a single line conductor extending to the terminal point identified by said direction signals.

112. In a telegraph system, a central station, a plurality of recorders at said station, a station remote from said central station, a line conductor connecting said stations, means at the remote station for transmitting over said line conductor code combinations of impulses identifying an address and a message, means at the central station for selecting one of the recorders in response to a code combination of impulses, means thereafter actuated whereby said selected recorder records the address and message code combinations of impulses, a plurality of other line conductors extending to different remote stations, means responsive to a code combination of impulses for the address for selecting one of said other line conductors, and means thereafter effective for transmitting the message to the station on said other line conductor.

113. In a telegraph system, a plurality of stations, a line conductor connecting said stations, means at one of said stations for transmitting over said line conductor a message including an address portion, mechanism at the other station for recording in response to the transmitted message the complete message, a plurality of other line conductors extending from the station at which said mechanism is located to other stations, means for selecting between said lines extending to other stations, and means controlled by the record of the address of the message as recorded by said mechanism for operating said selecting means to effect the selection of the desired line.

114. In a telegraph system, a plurality of stations, a line conductor connecting said stations, means at one of said stations for transmitting over said line conductor a message including an address portion, mechanism at the other station for recording in response to the transmitted message the complete message, a plurality of other line conductors extending from the station at which said mechanism is located to other stations, means for selecting between said lines extending to other stations, means controlled by the record of the address of the message as recorded by said mechanism for operating said selecting means to effect the selection of the desired line, and means operated following the operation of the selecting means for transmitting over the selected line the message.

115. In a telegraph system, a plurality of stations, a line conductor connecting said stations, means at one of said stations for transmitting over said line conductor a message including an address portion, means at the other station for recording the complete message on a continuous strip in response to the transmitted message in the form of control indicia, a plurality of other line conductors extending from the station at which the recording mechanism is located to other stations, means for selecting between said lines extending to other stations, means for successively sensing the control indicia for operating said selecting means to select the desired line as determined by the indicia for the address, and means operated following the line selection for transmitting over said line conductor impulses representative of the other indicia on said strip.

116. In a telegraph system, a plurality of stations, line conductors connecting said stations, means at one of said stations for transmitting code combinations of impulses for the address and body portions of a message over a line conductor to another station, means at said other station for recording said impulses in the form of control indicia on a continuous paper strip, means for selecting another line conductor extending to a different station, means for sensing said indicia to operate said means to complete a line selection, and means for effecting relative movement between said strip and said advancing means following the selection of the line.

117. In a telegraph system, a central station, a telegraph line extending from a remote station to said central station, means at said central station responsive to code combinations of impulses transmitted from said remote station over said telegraph line for preparing a record of said impulses, a plurality of telegraph lines extending from said central station to said remote stations, means responsive to certain of the impulses recorded in said record through the operation of said recording means for selecting one of said plurality of lines, and means operative following the selection of the line for transmitting impulses in accordance with the control indicia on said record.

118. In an automatic telegraph system, the combination of an originating point, an intermediate point, and a plurality of terminal points, a single line conductor connecting said originating point and said intermediate point, means at the originating point for transmitting to the intermediate point a succession of messages each including a direction signal in the form of a predetermined signal combination and a plurality of signal combinations representing the body of the message, a plurality of tape perforators at said intermediate point operative for storing said messages at said intermediate point but normally disconnected from said line conductor, means to connect said perforators concurrently to said line conductors, means responsive to the permutational nature of the direction signal of a message to retain but one of said perforators in operative condition for storing the message, a plurality of single line conductors extending from said intermediate point to said terminal points, and means responsive selectively in accordance with the permutational character of the direction signal stored in said tape through the operation of said selected tape perforator and utilized in the selection and retention of the said perforator in operative condition and again utilized for selecting a single line conductor extending to the terminal point identified by said direction signal.

119. In an automatic telegraph system, the combination of an originating point, an intermediate point, and a plurality of terminal points, a plurality of single line conductors each connecting one of said terminal points to said intermediate point, means at the originating point for transmitting to the intermediate point a succession of messages each including a direction signal in the form of a predetermined signal combination and a plurality of signal combinations representing the body of the message, a signal responsive perforator at said intermediate point for storing said messages in the form of perforated tape, means also at said intermediate point to sense said direction signal and to transmit serially electrical impulses representing said direction signal, selecting means operative in accordance with the premutational character of the said direction signals to select one of said line conductors extending from the intermediate point to one of the terminal points and started into operation at the conclusion of said transmission, and means operative after conclusion of said selection to restart said perforated tape and operative in accordance with the message signals stored in said perforated tape for transmitting over said selecting single line conductor to said terminal point in succession the impulses of the signal combinations representing the body of the message.

120. In an automatic telegraph system, the combination of a transfer point, means for transmitting to said transfer point a series of messages each including a directing signal of a predetermined code combination and a plurality of signal combinations representing the body of a message, a perforator at said transfer point responsive to said messages for storing said messages in the form of perforated tape, a plurality of terminal points, a plurality of single line conductors each connecting one of said terminal points with said transfer point, a tape sensing device, means for advancing said tape into said sensing device to effect sensing of one of said directing signals, means operative in response to the permutational character of the directing signals of the messages stored in said storing means to select one of said line conductors extending to a desired terminal point, transmitting means operative while said tape is resting in sensing position in said sensing device to transmit serially electrical impulses representing the sensed directing signal combination into said selecting means to initiate operations resulting in said selection of one of said single conductors, and means effective after said selection to advance said tape again for further sensing.

EDWARD E. KLEINSCHMIDT.